(12) United States Patent
Masuno et al.

(10) Patent No.: US 7,529,405 B2
(45) Date of Patent: May 5, 2009

(54) IMAGE PROCESSING APPARATUS AND IMAGE PROCESSING METHOD AS WELL AS COMPUTER PROGRAM

(75) Inventors: Tomonori Masuno, Tokyo (JP); Mitsuharu Ohki, Tokyo (JP); Rui Yamada, Kanagawa (JP)

(73) Assignee: Sony Corporation (JP)

( * ) Notice: Subject to any disclaimer, the term of this patent is extended or adjusted under 35 U.S.C. 154(b) by 682 days.

(21) Appl. No.: 11/264,130

(22) Filed: Nov. 2, 2005

(65) Prior Publication Data

US 2006/0098253 A1 May 11, 2006

(30) Foreign Application Priority Data

Nov. 8, 2004 (JP) ............................. 2004-323592

(51) Int. Cl.
*G06K 9/36* (2006.01)

(52) U.S. Cl. ..................... 382/166; 382/162; 382/274

(58) Field of Classification Search ............... 382/162, 382/166, 274; 348/222.1, 273, 231.6, E5.049, 348/E5.49; 345/589; 358/518, 448
See application file for complete search history.

(56) References Cited

U.S. PATENT DOCUMENTS 7,042,501 B1 * 5/2006 Matama ................ 348/222.1
7,200,279 B1 * 4/2007 Lin ............................ 382/274

FOREIGN PATENT DOCUMENTS

JP 2003-060983 2/2003

* cited by examiner

*Primary Examiner*—Anh Hong Do
(74) *Attorney, Agent, or Firm*—Rader Fishman & Grauer PLLC; Ronald P. Kananen

(57) ABSTRACT

An image processing apparatus and an image processing method are disclosed by which an image correction process for a false color such as a purple fringe can be executed efficiently while excessive reduction of the saturation is prevented to produce image data of a high quality. A saturation reduction rate corresponding to each pixel is calculated, and saturation reduction of the pixel is executed based on the saturation reduction rate. Then, saturation correction is executed so that the difference between the hue of the pixel whose saturation has been reduced and a surrounding reference pixel may be reduced. Further, a surrounding pixel to be referred to in the saturation correction process is selected along a scanning line.

24 Claims, 16 Drawing Sheets

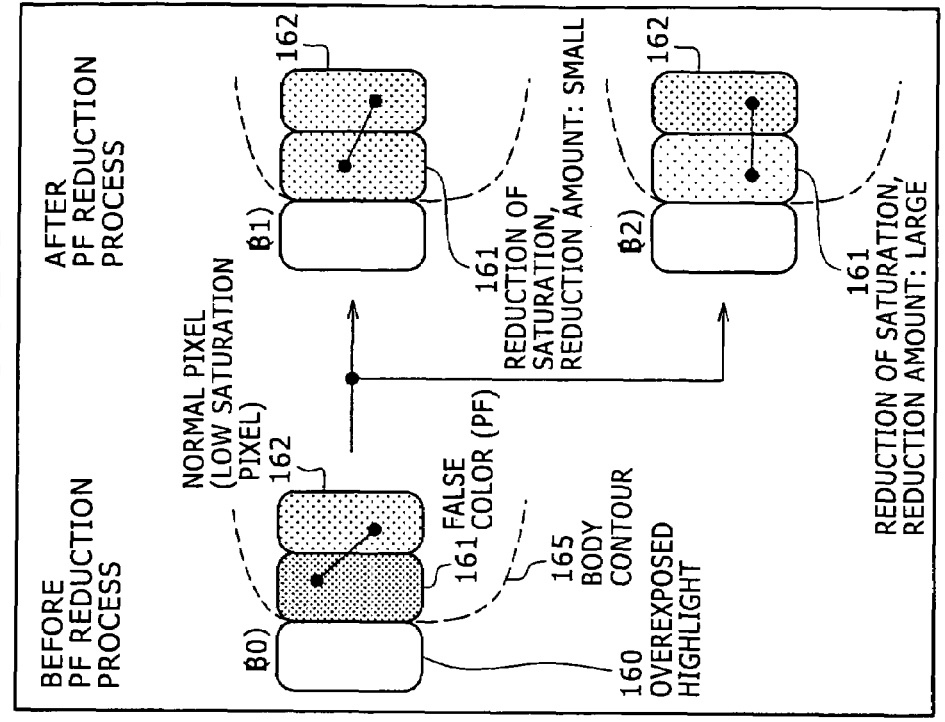
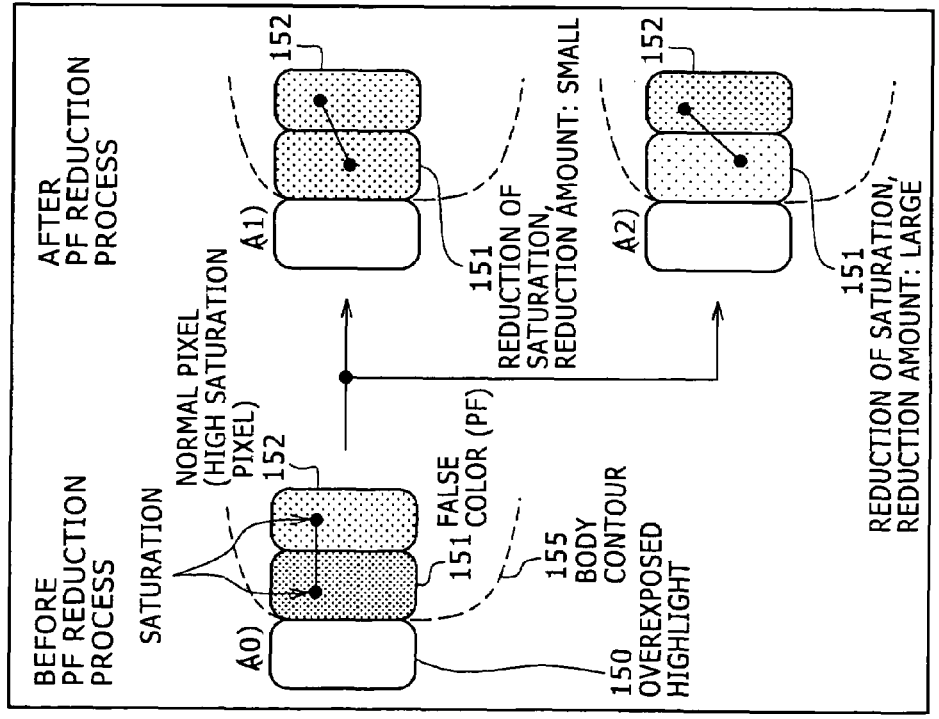

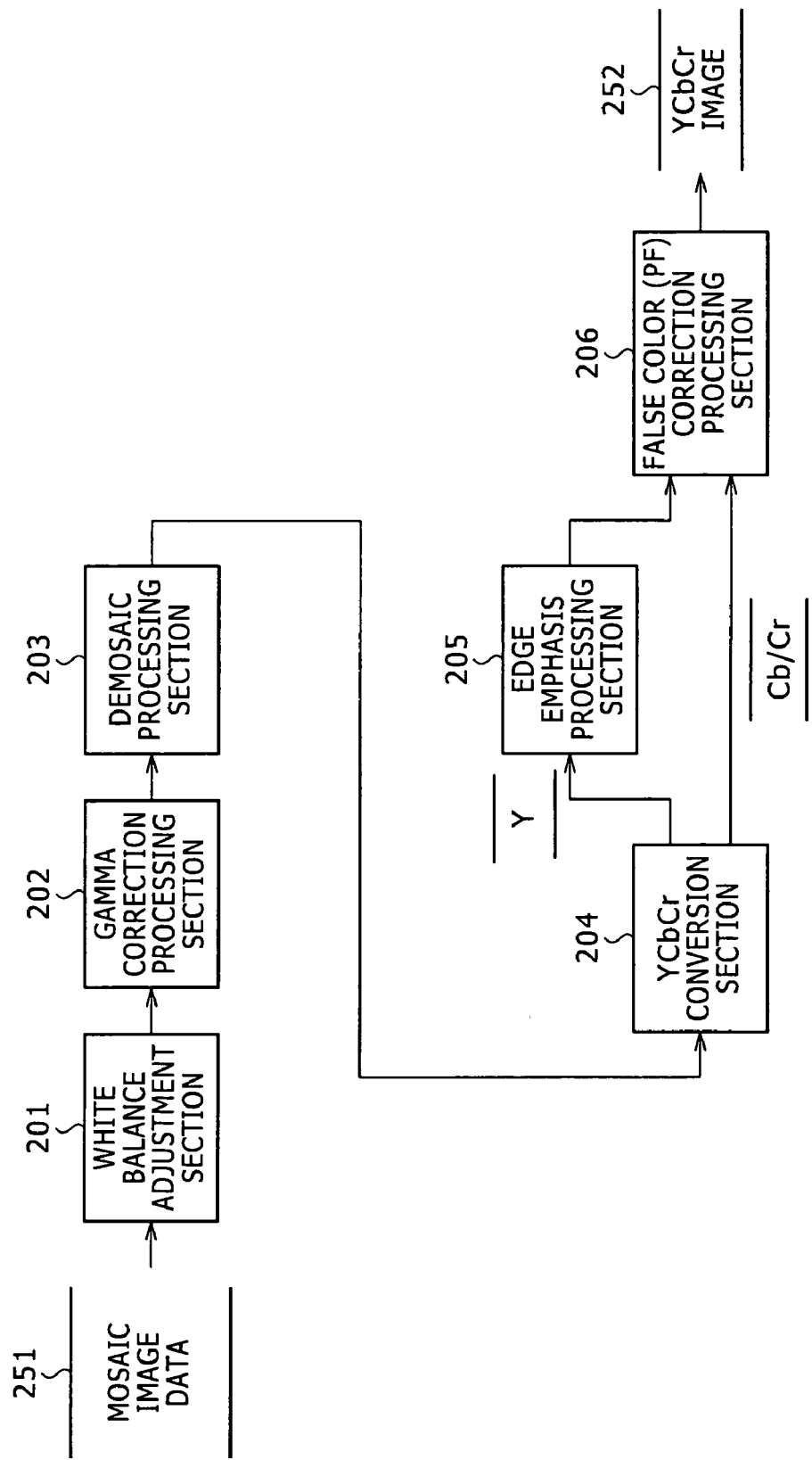

IMAGE PROCESSING APPARATUS AND IMAGE PROCESSING METHOD AS WELL AS COMPUTER PROGRAM

CROSS REFERENCES TO RELATED APPLICATIONS

The present invention contains subject matter related to Japanese Patent Application JP 2004-323592 filed in the Japanese Patent Office on Nov. 8, 2004, the entire contents of which being incorporated herein by reference.

BACKGROUND OF THE INVENTION

This invention relates to an image processing apparatus and an image processing method as well as a computer program, and more particularly to an image processing apparatus and an image processing method as well as a computer program wherein image data which suffers from a false color caused, for example, by aberration of a lens are corrected to produce image data of a high quality.

When an image is picked up by a camera, various problems are caused by aberration of a lens. Particularly where a camera which includes a lens having a high magnification or a lens produced by a low production cost is used to pick up an image, the picked up image sometimes suffers from a false color caused by aberration of the lens. Among such false colors, a false color of purple having a very high color saturation sometimes appears in the proximity of an edge of a low luminance region when an image of such a scene that the luminance difference is very great (for example, a scene in which a beam of the sun leaks through leaves of trees) is picked up. This is called purple fringe (PF) and has a bad influence on the picture quality.

This is a phenomenon that a false color is generated at an edge portion in an image because the point image distribution differs depending upon the wavelength. Even if a false color is not very conspicuous with ordinary pixels, if the image includes an edge portion of a high contrast at which an overexposed highlight by a saturation condition in luminance level occurs, then a purple false color appears around the edge portion and this makes the image different from a natural image. Usually, since a purple-like color appears frequently as a false color in the proximity of an overexposed highlight, such a false color as just mentioned is called purple fringe. However, depending upon the lens, image pickup condition and so forth, a greenish color sometimes appears as a false color. In this manner, various false colors possibly appear. In the following description, the term "purple fringe" is used to signify a phenomenon of appearance of a false color at an edge portion of a high contrast at which an overexposed highlight appears irrespective of the color generated.

As a countermeasure for reducing the chromatic aberration, a configuration is available wherein a lens made of a special material such as fluorite is applied. However, in order to produce such a lens as just mentioned, a high cost is required, and consequently, the produced lens becomes expensive. Therefore, the lens of the type described is not popularly used although it is used in some high-grade cameras such as a camera of the lens exchange type.

Japanese Patent Laid-Open No. 2003-60983 discloses a method of reducing false colors, which are generated by chromatic aberration, through an image process. According to the method, a process for suppressing the color, that is, a process for decreasing the saturation, is performed for a region of an image in which a high frequency component of a green channel has a high level. Further, as a countermeasure where an overexposed highlight appears, a configuration that two images are picked up with different exposures and an original luminance of an overexposed highlight is estimated to lower the chromatic saturation of the overexposed highlight is disclosed in Japanese Patent Laid-Open No. 2003-60983.

However, according to the process disclosed in Japanese Patent Laid-Open No. 2003-60983, since it is decided from a result of estimation of the luminance of an overexposed highlight by what degree the chromatic saturation can be decreased, there is the possibility that, if the estimation is made in error, then the original color of the image pickup subject may drop excessively. As a result, an unnatural resultant image may be formed. Further, it is necessary to perform image pickup twice with different exposures in order to allow luminance estimation of an overexposed highlight, and there is a problem that, if a camera is shaken by a hand, blurring of an image pickup subject or the like occurs, and it is difficult to obtain a correct result. Further, since the exposure must be changed to perform image pickup twice, there is a problem that the method cannot be applied where image pickup of moving pictures is performed using a video camera or the like.

SUMMARY OF THE INVENTION

It is desirable to provide an image processing apparatus and an image processing method as well as a computer program by which an efficient image correction process for moving pictures picked up by a video camera or the like can be performed. According to the present invention, an image process is executed on a real-time basis for image data of a fixed frame rate inputted from an image pickup section, and resulting data are stored into a memory or outputted.

It is desirable to provide an image processing apparatus and an image processing method as well as a computer program by which image data of a high quality can be produced.

According to the present invention, taking notice of a false color such as a purple fringe which appears around an overexposed highlight, a false color region is detected, and an image process by which correction of the false color is performed principally is executed to produce image data of a high quality.

Further, according to the present invention, a false color degree of a noticed pixel selected from among component pixels of image data is calculated as a parameter indicative of the possibility that the notice pixel may be a false color pixel, and a saturation reduction rate is calculated based on the false color degree, whereafter a saturation reduction process based on the calculated saturation reduction rate and a succeeding saturation correction process are performed so that a pixel having an excessively reduced saturation may not appear.

In particular, according to an embodiment of the present invention, there is provided an image processing apparatus including a correction parameter calculation section for calculating, as a correction parameter for component pixels of a processing image, a saturation reduction rate corresponding to each of the pixels, and a correction processing section for applying the saturation reduction rate to execute a pixel value correction process including a saturation reduction process of the component pixels of the processing image. The correction processing section includes a pixel saturation reduction processing section for executing the saturation reduction process for each of the pixels based on the saturation reduction rate calculated by the correction parameter calculation section, and a pixel saturation correction processing section for correcting the saturation of any saturation reduction pixel whose saturation has been reduced by the pixel saturation reduction processing section so that the difference of the saturation of the saturation reduction pixel and the saturation of a surrounding reference pixel is reduced.

The image processing apparatus may be configured such that the pixel saturation correction processing section selects one of those pixels which are positioned in the proximity of the saturation reduction pixel and along the same scanning line as that of the saturation reduction pixel as a reference pixel and executes the saturation correction process for the saturation reduction pixel so that the difference between the saturation of the selected reference pixel and the saturation of the saturation reduction pixel is reduced.

As an alternative, the image processing apparatus may be configured such that the pixel saturation correction processing section selects those pixels which are positioned in the proximity of the saturation reduction pixel and along the same scanning line as that of the saturation reduction pixel as reference pixels and executes a process of adjusting the saturation of the saturation reduction pixel so as to approach the saturation of that one of the reference pixels which has the highest saturation.

As another alternative, the image processing apparatus may be configured such that the pixel saturation correction processing section selects those pixels which are positioned in the proximity of the saturation reduction pixel and along the same scanning line as that of the saturation reduction pixel as reference pixels and executes, if the saturation of that one of the reference pixels which has the highest saturation is equal to or lower than the saturation of the saturation reduction pixel prior to the saturation reduction, a process of adjusting the saturation of the saturation reduction pixel so as to approach the saturation of the saturation reduction pixel prior to the saturation reduction.

The image processing apparatus may be configured such that the correction parameter calculation section calculates, as regards a noticed pixel selected from within the processing image, (a) a purple degree as similarity information between the hue of the noticed pixel and the hue of a false color, and (b) distance information of the noticed pixel from an overexposed highlight pixel, calculates (c) a false color degree based on the purple degree and the distance information, and (d) a directional gain based on direction information of the noticed pixel from the overexposed highlight pixel, and calculates the saturation reduction rate corresponding to the noticed pixel based on the false color degree and the directional gain.

In this instance, the image processing apparatus may be configured such that the correction parameter calculation section calculates the false color degree which has a value which increases as the similarity between the hue of the noticed pixel and the hue of the false color increases and as the distance from the overexposed highlight pixel increases, calculates the directional gain which has a value which increases as the parallelism between the noticed pixel and overexposed highlight pixel and the scanning line increases, and calculates the saturation reduction rate which has a value which increases as the false color degree of the noticed pixel increases and as the directional gain increases. The pixel saturation reduction processing section executes the saturation reduction process for each pixel based on the saturation reduction rate calculated by the correction parameter calculation section.

According to another embodiment of the present invention, there is provided an image processing method including the steps of calculating, as a correction parameter for component pixels of a processing image, a saturation reduction rate corresponding to each of the pixels, and applying the saturation reduction rate to execute a pixel value correction process including a saturation reduction process of the component pixels of the processing image. The correction processing step includes steps of executing the saturation reduction process for each of the pixels based on the saturation reduction rate calculated by the correction parameter calculation step, and correcting the saturation of any saturation reduction pixel whose saturation has been reduced by the pixel saturation reduction processing step so that the difference of the saturation of the saturation reduction pixel and the saturation of a surrounding reference pixel is reduced.

The image processing method may be configured such that the pixel saturation correction processing step selects one of those pixels which are positioned in the proximity of the saturation reduction pixel and along the same scanning line as that of the saturation reduction pixel as a reference pixel and executes the saturation correction process for the saturation reduction pixel so that the difference between the saturation of the selected reference pixel and the saturation of the saturation reduction pixel is reduced.

As an alternative, the image processing method may be configured such that the pixel saturation correction processing step selects those pixels which are positioned in the proximity of the saturation reduction pixel and along the same scanning line as that of the saturation reduction pixel as reference pixels and executes a process of adjusting the saturation of the saturation reduction pixel so as to approach the saturation of that one of the reference pixels which has the highest saturation.

As another alternative, the image processing method may be configured such that the pixel saturation correction processing step selects those pixels which are positioned in the proximity of the saturation reduction pixel and along the same scanning line as that of the saturation reduction pixel as reference pixels and executes, if the saturation of that one of the reference pixels which has the highest saturation is equal to or lower than the saturation of the saturation reduction pixel prior to the saturation reduction, a process of adjusting the saturation of the saturation reduction pixel so as to approach the saturation of the saturation reduction pixel prior to the saturation reduction.

The image processing method may be configured such that the correction parameter calculation step calculates, as regards a noticed pixel selected from within the processing image, (a) a purple degree as similarity information between the hue of the noticed pixel and the hue of a false color, and (b) distance information of the noticed pixel from an overexposed highlight pixel, calculates (c) a false color degree based on the purple degree and the distance information, and (d) a directional gain based on direction information of the noticed pixel from the overexposed highlight pixel, and calculates the saturation reduction rate corresponding to the noticed pixel based on the false color degree and the directional gain.

In this instance, the image processing method may be configured such that the correction parameter calculation step calculates the false color degree which has a value which increases as the similarity between the hue of the noticed pixel and the hue of the false color increases and as the distance from the overexposed highlight pixel increases, calculates the directional gain which has a value which increases as the parallelism between the noticed pixel and overexposed highlight pixel and the scanning line increases, and calculates the saturation reduction rate which has a value which increases as the false color degree of the noticed pixel increases and as the directional gain increases. The pixel saturation reduction processing step executes the saturation reduction process for each pixel based on the saturation reduction rate calculated by the correction parameter calculation step.

According to a further embodiment of the present invention, there is provided a computer program for causing image processing to be executed on a computer, including the steps of calculating, as a correction parameter for component pixels of a processing image, a saturation reduction rate corresponding to each of the pixels, and applying the saturation reduction rate to execute a pixel value correction process including a saturation reduction process of the component pixels of the processing image. The correction processing step includes steps of executing the saturation reduction process for each of the pixels based on the saturation reduction rate calculated by the correction parameter calculation step, and correcting the saturation of any saturation reduction pixel whose saturation has been reduced by the pixel saturation reduction processing step so that the difference of the saturation of the saturation reduction pixel and the saturation of a surrounding reference pixel is reduced.

It is to be noted that the computer program of the present invention can be provided, for example, to a general purpose computer system which can execute various program codes through a recording medium or a communication medium by which the computer program is provided in a computer-readable form, for example, a storage medium such as a CD, an FD or an MO or a communication medium such as a network. Where such a program as described above is provided in a computer-readable form, processes according to the program are implemented on the computer system.

According to the present invention, as a correction parameter for component pixels of a processing image, a saturation reduction rate corresponding to each of the pixels is calculated, and a saturation reduction process for each of the pixels is executed based on the calculated saturation reduction rate. Further, the saturation of any saturation reduction pixel whose saturation has been reduced is corrected so that the difference of the saturation of the saturation reduction pixel and the saturation of a surrounding reference pixel is reduced. Consequently, for example, in a correction process of a false color pixel which suffers from a purple fringe or the like, unfavorable conspicuousness of the pixel by a great difference in saturation from surrounding pixels caused by excessive reduction of the saturation of the pixel can be prevented. Consequently, correction image data of a high quality can be produced.

Further, according to the present invention, a saturation reduction rate corresponding to each of the pixels is calculated, and a saturation reduction process for each of the pixels is executed based on the calculated saturation reduction rate. Further, the saturation of any saturation reduction pixel whose saturation has been reduced is corrected so that the difference of the saturation of the saturation reduction pixel and the saturation of a surrounding reference pixel is reduced. Furthermore, a surrounding pixel or pixels to be referred to in a saturation correction process are selected along a scanning line. Consequently, pixel information picked up by a video camera or the like and inputted along the scanning line can be used alone to perform an image process. Therefore, an efficient real-time image process can be achieved.

Furthermore, according to the present invention, in calculation of a saturation reduction rate as a correction parameter, a false color degree is calculated such that it has a value which increases as the similarity between the hue of the noticed pixel and the hue of a false color increases and as the distance from an overexposed highlight pixel increases, and a directional gain is calculated such that it has a value which increases as the parallelism between the noticed pixel and overexposed highlight pixel and a scanning line increases. Further, the saturation reduction rate is calculated such that it has a value which increases as the false color degree of the noticed pixel increases and as the directional gain increases. Furthermore, in the saturation reduction process, the saturation reduction process for each pixel is executed based on the saturation reduction rate having the property described. Therefore, where a normal pixel which is not a false color pixel exists on the same scanning line as that of the noticed pixel, the saturation reduction process is executed with a high saturation reduction rate, and thereafter, saturation correction can be performed based on the saturation information of the normal pixel. On the other hand, if a normal pixel which is not a false color pixel does not exist on the same scanning line as that of the noticed pixel, then the saturation reduction process is performed with a reduced saturation reduction rate. Therefore, even when saturation information of a normal pixel cannot be acquired in the later saturation correction process, the difference in saturation from the surrounding pixels can be prevented from becoming excessively great. Consequently, correction image data of a high quality can be produced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are schematic views illustrating a problem involved in a chromatic saturation correction process of a false color (PF) pixel;

FIG. 3 is a block diagram showing a processing configuration of a digital signal processing section (DSP) of the image processing apparatus of FIG. 1;

DETAILED DESCRIPTION OF THE PREFERRED EMBODIMENTS

In the following, details of an image processing apparatus and an image processing method as well as a computer program according to the present invention are described with reference to the accompanying drawings.

Figure 1:
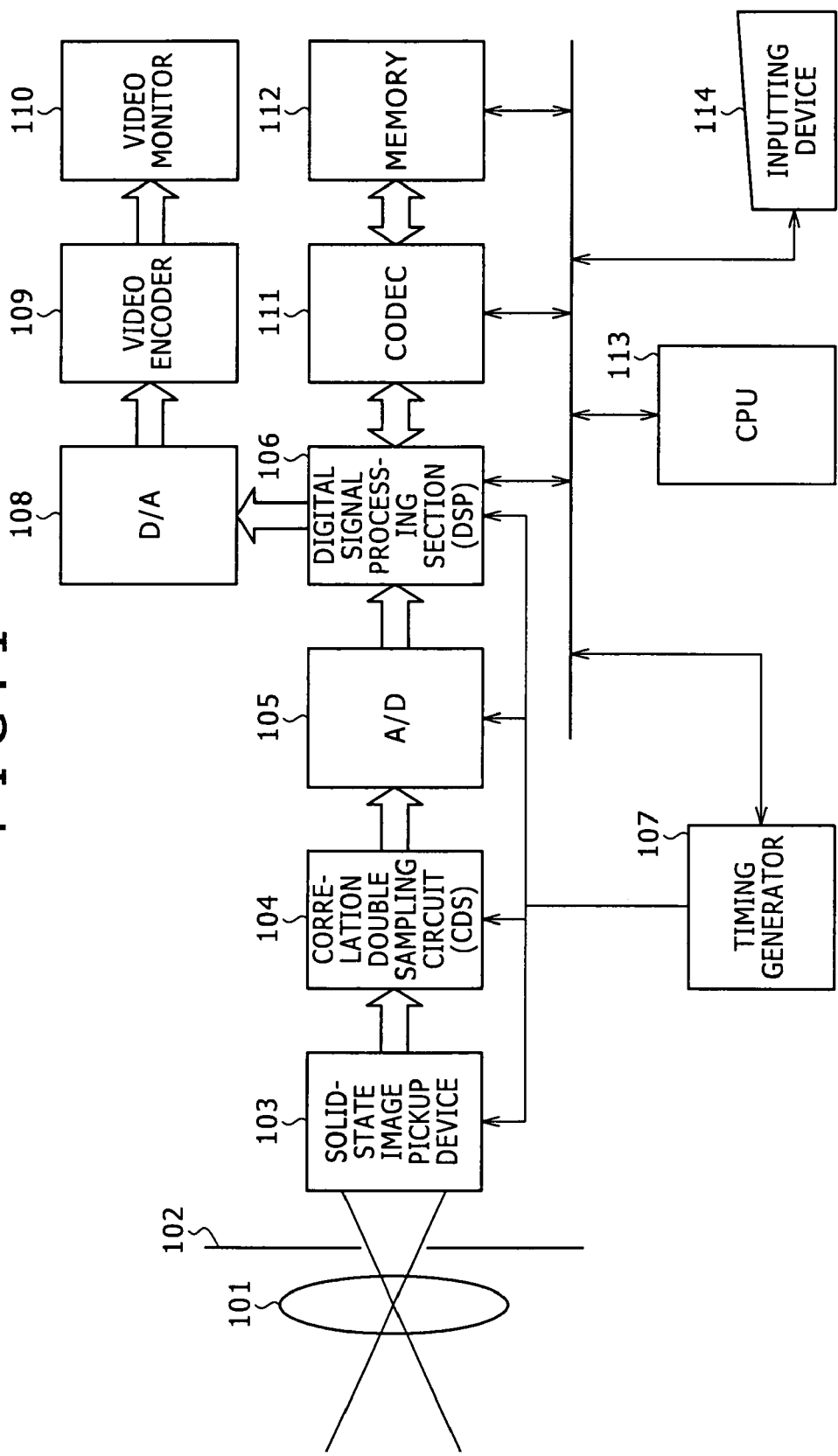
FIG. 1 is a block diagram showing a configuration of an image processing apparatus to which the present invention is applied.

FIG. 1 shows an example of a configuration of the image processing apparatus. It is to be noted that, while the image processing apparatus shown in FIG. 1 is shown as an example of an apparatus which includes an image pickup section and executes a correction process for image data picked up by the image pickup section, also it is possible for the image processing apparatus of the present invention to receive image data stored in a storage section such as, for example, a hard disk as an input thereto and execute correction of the inputted image. Further, the image data of an object of the correction process may not only be data inputted through the image pickup section but also be any input image data such as image data inputted through a storage section or a network.

A detailed configuration of the image processing apparatus shown in FIG. 1 is described. Referring to FIG. 1, the image processing apparatus includes a lens 101, an iris 102, a solid-state image pickup device (CCD) 103, a correlation double sampling circuit 104, an A/D converter 105, a DSP block 106, and a timing generator 107. The image processing apparatus further includes a D/A converter 108, a video encoder 109, a video monitor 110, a codec 111, a memory 112, a CPU 113 and an inputting device 114.

The inputting device 114 includes operation buttons such as a recording button provided on the camera body. The DSP block 106 is a block which includes a processor for signal processing and a RAM for an image. The processor for signal processing performs programmed image processing for image data stored in the image RAM.

General operation of the image processing apparatus of the present embodiment is described below.

Incoming light coming to the solid-state image pickup device (CCD) 103 through an optical system is first received by light receiving elements on an image pickup plane and converted into electric signals by photoelectric conversion by the light receiving elements. Then, noise is removed from the electric signals by the correlation double sampling circuit 104, and resulting signals are converted into digital signals by the A/D converter 105 and temporarily stored into an image memory in the DSP block 106.

While the camera is picking up an image, the timing generator 107 controls the signal processing system so that image fetching at a fixed frame rate may be maintained. A stream of pixel signals is sent at a fixed rate also to the digital signal processing section (DSP) 106, by which appropriate signal processing is performed for the stream. Resulting image data are sent to one or both of the D/A converter 108 and the codec 111. The D/A converter 108 converts the image data supplied thereto from the digital signal processing section (DSP) 106 into an analog signal, and the analog signal is converted into a video signal by the video encoder 109. The video signal can be monitored on the video monitor 110. In the present embodiment, the video monitor 110 serves as a viewfinder of the camera. Meanwhile, the codec 111 encodes the image data supplied thereto from the digital signal processing section (DSP) 106, and the encoded image data are recorded into the memory 112. Here, the memory 112 may be a recording apparatus which uses a semiconductor recording medium, a magnetic recording medium, a magneto-optical recording medium, an optical recording medium or the like.

While general operation of the entire system of the digital video camera as an example of the image processing apparatus of the present embodiment is such as described above, the image processing according to the present invention, that is, an image data correction process, is executed by the digital signal processing section (DSP) 106.

In the following, details of the image data correction process executed by the image processing apparatus of the present embodiment are described. In the image process executed by the image processing apparatus of the present embodiment, a false color such as a purple fringe appearing principally around an overexposed highlight is detected and the false color degree of each pixel is calculated, and appropriate correction is performed corresponding to the thus calculated false color degrees. Image data of a high quality are produced by the correction process.

First, a manner of appearance of a false color (purple fringe) and an outline of the process of the present invention are described. A false color (purple fringe) is a phenomenon that a color offset by chromatic aberration appears strikingly around an overexposed highlight pixel section. An overexposed highlight pixel is a pixel of a high luminance whose level is proximate to a saturation level. A false color of, for example, purple different from an original hue of an image pickup subject appears on pixels around overexposed highlight pixels which are such high luminance pixels as described above. The false color pixels are called purple fringe (PF).

The size of the overexposed highlight range in which the false color (PF: purple fringe) appears is coordinated with the iris and the focal length of the optical system and changes relying upon the distance from the optical center. Also as regards the direction in which the false color appears, the false color appears in a direction from the optical center toward the outer side of the overexposed highlight pixels and also in the opposite direction from the overexposed highlight pixels toward the optical center. The tendency in which the false color appears depends upon the optical system used for image pickup.

In the image process of the present invention, component pixels of an image frame inputted as a picked up image are successively selected as a noticed pixel, and it is determined whether or not an overexposed highlight pixel exists in the proximity of the noticed pixel, whereafter it is determined whether or not the noticed pixel exhibits a purple color and has a high saturation. In other words, a pixel which satisfies the following conditions:

(a) an overexposed highlight pixel exists around the noticed pixel;

(b) the noticed pixel exhibits a purple color; and (c) the noticed pixel has a high saturation is determined as a false color (PF: purple fringe) pixel, and the correction process is executed for the pixel.

In one possible form of the correction processing, a correction process based on peripheral pixels is executed for a false color (PF) pixel such as to acquire pixel values of pixels which are positioned around a detected false color pixel but do not exhibit a false color (PF) and determine an average value of the acquired pixel values as a pixel value of the false color pixel. However, the interpolation process, wherein pixel values of peripheral pixels are acquired, a pixel value to be set to the false color pixel is calculated based on the acquired pixel values, and then the calculated pixel value is re-set as the pixel value of the false color pixel, has a problem that it increases the processing load.

For example, if the interpolation process described above is performed for an image inputted at a fixed frame rate from an image picked up by a video camera, then the possibility that the correction process may not be performed at the video frame rate is high. Therefore, the interpolation process is not practical as a process for a picked up image of a video camera.

In the image process of the present invention, rather than an interpolation process wherein pixel values of peripheral pixels are applied as described above, a process of decreasing the saturation of a pixel is performed. However, if a pixel which satisfies the criteria (a) to (c) described hereinabove is selected as a false color (PF) pixel and the saturation reduction process is performed only for the selected false color (PF) pixel, depending upon the saturations of surrounding pixels of the false color (PF) pixel for which the saturation reduction process has been performed, the saturation decrease only at the false color (PF) pixel portion becomes conspicuous, which makes the image look unnatural.

This phenomenon is described with reference to FIGS. 2A and 2B, which illustrate an example of a process wherein a false color (PF) pixel exists in a region contiguous to an overexposed highlight pixel which is a high luminance pixel. FIGS. 2A and 2B actually illustrate processes in cases in which component pixels have different saturations. In FIGS. 2A and 2B, A0 and B0 indicate pixel configurations prior to the process. In particular, false color (PF) pixels 151 and 161 as purple fringe pixels are positioned adjacent overexposed highlight pixels 150 and 160 having a substantially saturation luminance level, respectively. It is to be noted that each of the overexposed highlight pixels 150 and 160, the false color (PF) pixels 151 and 161 and normal pixels 152 and 162 represents not a single pixel but a pixel group including a plurality of pixels.

Next to the false color (PF) pixels 151 and 161, the normal pixels 152 and 162 which have a hue and a saturation of a material body of the image pickup subject and are not false color pixels are positioned, respectively. It is to be noted that each broken line shown in FIGS. 2A and 2B denotes a body contour 155 or 165 which is a contour of the material body as the image pickup subject. The difference between FIGS. 2A and 2B resides in the saturations of the normal pixels 152 and 162 adjacent the false color (PF) pixels 151 and 161.

In the case of FIG. 2A, the normal pixel 152 adjacent the false color (PF) pixel 151 has a high saturation and is a high saturation pixel. A dark dot in FIG. 2A schematically illustrates the level of the saturation of a pixel. Where the dark dot is shown at a high position, it indicates a high saturation, but where the dark dot is shown at a low position, it indicates a low saturation. In the case of FIG. 2B, the normal pixel 162 adjacent the false color (PF) pixel 161 has a low saturation and is a low saturation pixel. A dark dot in FIG. 2B schematically illustrates the level of the saturation of a pixel. Where the dark dot is shown at a high position, it indicates a high saturation, but where the dark dot is shown at a low position, it indicates a low saturation. It is to be noted that the false color (PF) pixels 151 and 161 are pixels having a high saturation and having a hue of a purple color and do not reflect a color or a saturation of the material body of the original image pickup subject. In such an instance as just described, if a saturation reduction process for the false color (PF) pixels 151 and 161 is performed, then in most cases, the false color (PF) pixels 151 and 161 become less conspicuous and an improved image is obtained.

However, as described hereinabove, under certain circumstances, that is, depending upon the saturation of surrounding pixels of a false color (PF) pixel, discoloring only at the false color (PF) pixel portion becomes conspicuous and the image sometimes looks unnatural.

Not only the false color (PF) pixel 151 shown in FIG. 2A but also the false color (PF) pixel 161 shown in FIG. 2B satisfy the conditions described hereinabove, that is, the conditions (a) an overexposed highlight pixel exists around the noticed pixel;

(b) the noticed pixel exhibits a purple color; and (c) the noticed pixel has a high saturation and are determined to be false color (PF: purple fringe) pixels. Thus, it is determined that the saturation reduction process should be performed for the false color (PF) pixels 151 and 161.

Results of the saturation reduction process for the false color pixels are indicated by A1 and A2 in FIG. 2A. In particular, A1 indicates a result of the process where the saturation of the false color (PF) pixel 151 is reduced a little and A2 indicates a result of the process where the saturation of the false color (PF) pixel 151 is reduced by a great amount. Also in FIG. 2B, B1 indicates a result of the process where the saturation of the false color (PF) pixel 161 is reduced a little and B2 indicates a result of the process where the saturation of the false color (PF) pixel 161 is reduced by a great amount. In FIGS. 2A and 2B, the amount of movement of each dark dot in the downward direction corresponds to the reduced amount of the saturation.

As seen from A2 of FIG. 2A, when the saturation of the false color (PF) pixel 151 is reduced by a great amount, although the adjacent normal pixel 152 has a high saturation, only the saturation of the false color (PF) pixel 151 is reduced by a great amount and a clear difference in saturation appears between the two pixels. Originally, not only the false color (PF) pixel 151 but also the normal pixel 152 are pixels representing two material bodies partitioned by the body contour 155 and a great difference in saturation should not appear between the two pixels 151 and 152. However, in the corrected image shown in FIG. 2A, the saturation of the false color (PF) pixel 151 for which the saturation reduction process has been performed visually exhibits a saturation much different from that of the normal pixel 152, and the pixel having the reduced saturation is a visually conspicuous pixel and exhibits a very unnatural appearance. In such an instance as just described, the correction process for the saturation reduction does not result in enhancement of the image quality.

Where the pixel configurations are such as described above, the image process of the present invention eliminates the unnaturalness by performing such correction that the saturation of the false color (PF) pixel 151 is not reduced by a great amount when compared with the saturation of the normal pixel 152. For example, a saturation reduction process for the false color (PF) pixel 151 is performed by such a degree as indicated by A1 so that the difference in saturation from the normal pixel 152 may not become excessively great.

On the other hand, where the normal pixel 162 adjacent the false color (PF) pixel 161 has a low saturation and is a low saturation pixel as seen in FIG. 2B, even if the process of reducing the saturation of the false color (PF) pixel 161 by a great amount is performed, the difference in saturation from the adjacent normal pixel 162 does not become great as seen from B2 of FIG. 2B. In other words, since, in this instance, also the saturation of the adjacent normal pixel 162 is low and the difference in saturation between the pixels is small, the pixels provide no visual unnaturalness.

On the contrary, where the saturation of the adjacent normal pixel 162 is low in this manner, if the saturation reduction process wherein the reduction amount from that of the false color (PF) pixel 161 is set to a low value as seen in B1 of FIG. 2B, then a difference remains between the saturation of the false color (PF) pixel 161 and the saturation of the normal pixel 162. This makes the image an unnatural image in which the false color (PF) pixel 161 is conspicuous and from which a purple fringe is visually recognized. Accordingly, in such a pixel configuration as shown in FIG. 2B, it is preferable to perform a saturation reduction process wherein the reduction amount for the false color (PF) pixel 161 is set to a high value.

In the image process of the present invention, when the saturation reduction process for a false color (PF) pixel is performed, a saturation adjustment process is performed such that the difference in saturation of the false color (PF) pixel from pixels in a peripheral region may not become great thereby producing a correction image of a high quality. In the following, details of the image process of the present invention are described.

In the image process of the present invention, a false color degree (PF degree) hereinafter described is calculated for component pixels of each image frame picked up by the image pickup section, for example, of the image processing apparatus shown in FIG. 1 and inputted to the digital signal processing section (DSP) 106. Then, a correction process is performed based on the calculated false color degree (PF degree) for each pixel. "PF" signifies the purple fringe.

It is to be noted that, while a typical phenomenon of a false color caused by lens aberration which appears at an edge portion of a high contrast at which an overexposed highlight appears as a saturation state of the luminance level is called purple fringe as described hereinabove, the false color is not limited to a purple color but may sometimes be a greenish color. The embodiment described below can be applied to a correction process not only for a purple color but also for an arbitrary false color which may appear around an overexposed highlight.

An entire sequence of the image process executed by the digital signal processing section (DSP) 106 of the image processing apparatus of the present invention is described with reference to FIG. 3. The digital signal processing section (DSP) 106 executes a data process, for example, in accordance with a computer program. FIG. 3 is a block diagram in which different functions of the digital signal processing section (DSP) 106 are shown as blocks in order to illustrate the process executed by the digital signal processing section (DSP) 106.

As seen in FIG. 3, the digital signal processing section (DSP) 106 includes a white balance adjustment section 201, a gamma correction processing section 202, a demosaic processing section 203, a YCbCr conversion section 204, an edge emphasis processing section 205 and a false color (PF) correction processing section 206.

An image signal acquired by the solid-state image pickup device (CCD) 103 of the image processing apparatus shown in FIG. 1 is a mosaic image 251 of colors. For example, if image pickup is performed through a color filter having a color array such as, for example, a color array of an original color system (for example, the Bayer array), then a signal of a predetermined wavelength, that is, only color component data of the particular wavelength, is acquired for each pixel. For example, where a solid-state image pickup device of a single plate color type of the Bayer array is used, an output image of the solid state image pickup device makes a mosaic image 251 having information only of R, G or B for each pixel.

The digital signal processing section (DSP) 106 receives the mosaic image 251 as an input thereto, and the white balance adjustment section 201 executes white balance adjustment first and then the gamma correction processing section 202 performs a gamma correction process. Then, the demosaic processing section 203 executes a demosaic process as a data production process for producing data wherein RGB data are set to all pixels from the color mosaic image.

Thereafter, the demosaic image data wherein RGB data are set to all pixels are inputted to the YCbCr conversion section 204, which thus executes a conversion process of the RGB signal into a signal of a YCbCr color space to separate the RGB signal into a luminance signal (Y) and color signals (Cb, Cr). The luminance signal (Y) is inputted to the edge emphasis processing section 205, by which an edge emphasis process is performed based on the luminance signal (Y).

Then, the false color (PF) correction processing section 206 receives the luminance signal (Y) after the edge emphasis process and the color signals (Cb, Cr), and executes a false color (PF) correction process to produce YCbCr image data 252 formed from the corrected luminance signal (Y) and color signals (Cb, Cr). Image data based on the YCbCr image data 252 are stored into a memory in the image processing apparatus and/or outputted to an outputting section such as a monitor apparatus.

In the processing functions illustrated in FIG. 3, the processes by the blocks from the white balance adjustment section 201 to the edge emphasis processing section 205 are similar to those executed by an image processing apparatus of a conventional digital video camera and so forth, and therefore, detailed description of the processes is omitted herein to avoid redundancy. The process by the false color (PF) correction processing section 206 is unique to the present invention, and details of the process executed by the false color (PF) correction processing section 206 are described.

Figure 4:
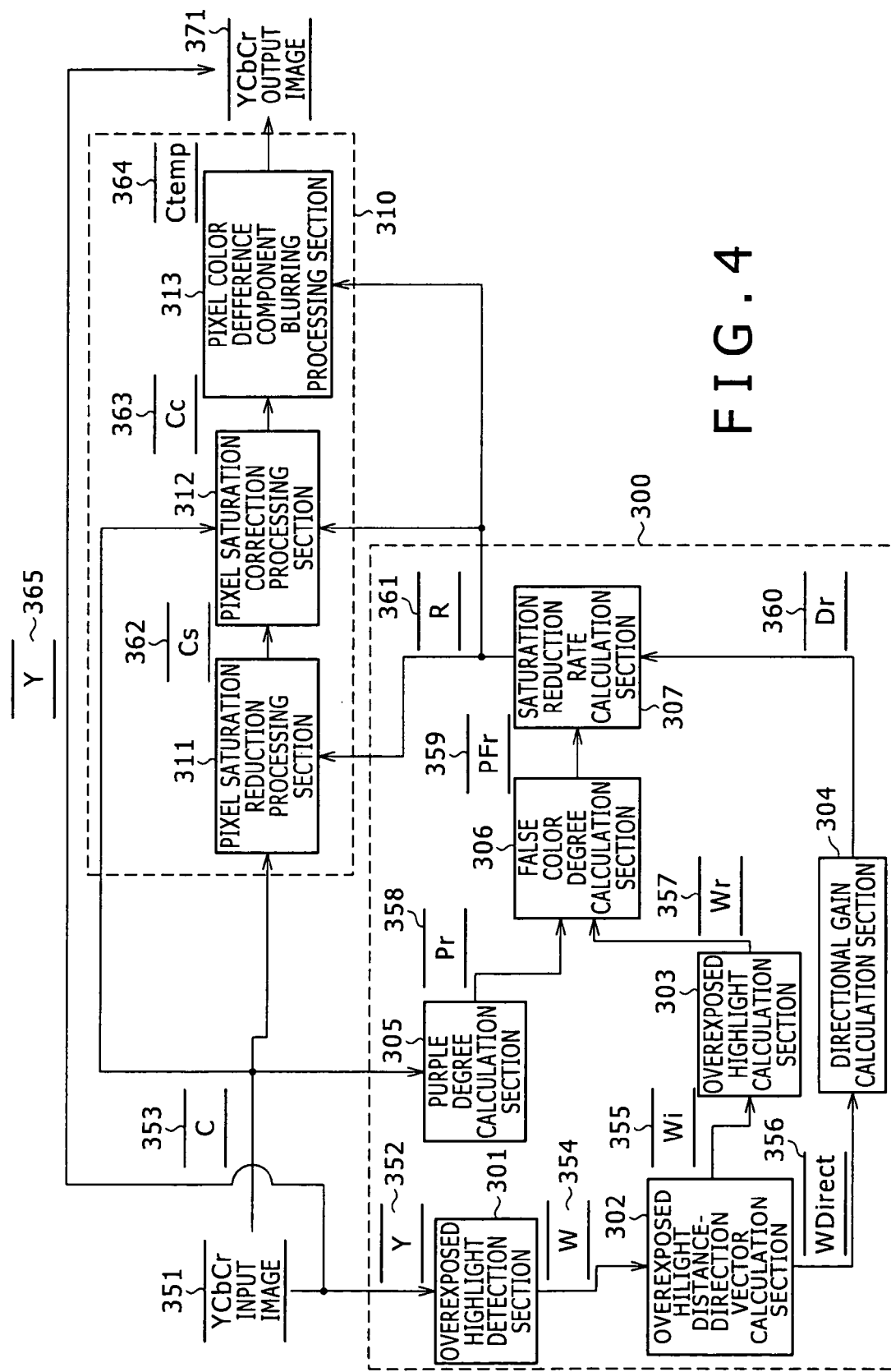
FIG. 4 is a block diagram showing a processing configuration of a false color (PF) correction processing section of the digital signal processing section of FIG. 3.

FIG. 4 illustrates the process by the false color (PF) correction processing section 206. As described hereinabove, the digital signal processing section (DSP) 106 executes a data process, for example, in accordance with a computer program. FIG. 4 illustrates the process executed by the digital signal processing section (DSP) 106 as blocks of different functions. In FIG. 4, the blocks shown correspond to the individual processing functions executed by the false color (PF) correction processing section 206, and data transferred between different processing functions are indicated as data sandwiched by upper and lower lines.

The false color (PF) correction processing section 206 is roughly divided into two processing sections as seen in FIG. 4. One of the processing sections is a correction parameter (saturation reduction rate) calculation section 300, and the other processing section is a correction processing section 310. The correction parameter (saturation reduction rate) calculation section 300 calculates, based on a YCbCr input image 351 which is input image data, a false color degree which is an index value representing by what amount the color of each of component pixels of the input image is near to a false color (PF). Then, the correction parameter (saturation reduction rate) calculation section 300 calculates a saturation reduction rate which is a correction parameter based on the calculated false color degree. The false color degree and the saturation reduction ratio are successively calculated as pixel coordinated values for each of the component pixels of the image data.

The correction processing section 310 receives the saturation reduction rates corresponding to the pixels calculated by the correction parameter (saturation reduction rate) calculation section 300 and executes, based on the saturation pixel values inputted thereto, pixel value correction for the component pixels of the YCbCr input image 351 of the input image data, particularly, a saturation reduction process, a saturation correction process and a blurring process. Results of the correction process by the correction processing section 310 are outputted as a correction result image, that is, a YCbCr output image 371. Consequently, image data based on the YCbCr output image 371 are stored into the memory or outputted to the monitor.

First, an outline of a series of processes executed by the false color (PF) correction processing section 206 shown in FIG. 4 is described. Details of the processes by the component sections are described later. The YCbCr input image 351 for/which the edge emphasis process has been performed is inputted from the YCbCr conversion section 204 and the edge emphasis processing section 205 separately as a luminance component [Y] 352 and a color difference component [C] 353 to the false color (PF) correction processing section 206. In particular, the luminance component [Y] 352 and the color difference component [C] 353 are successively inputted for each of pixel lines, for example, along a scanning line.

First, an overexposed highlight detection section 301 of the correction parameter (saturation reduction rate) calculation section 300 uses the luminance component [Y] 352 to perform an overexposed highlight detection process and outputs a resulting overexposed highlight detection map [W] 354. An overexposed highlight distance-direction vector calculation section 302 receives the overexposed highlight detection map [W] 354 as an input thereto and performs a calculation process of the distance and the direction vector of a noticed pixel from an overexposed highlight pixel and outputs a distance [Wi] 355 to the nearest overexposed highlight and a direction vector [WDirect] 356 in which the nearest overexposed highlight exists.

An overexposed highlight degree calculation section 303 receives the distance [Wi] 355 to the nearest overexposed highlight as an input thereto to perform an overexposed highlight degree calculation process and outputs an overexposed highlight degree [Wr] to a false color degree calculation section 306. On the other hand, the direction vector [WDirect] 356 in which the nearest overexposed highlight exists is inputted to a directional gain calculation section 304, by which a directional gain [Dr] 360 is calculated based on the direction vector [WDirect] 356. The directional gain [Dr] 360 calculated is outputted to a saturation reduction rate calculation section 307.

Meanwhile, the color difference component [C] 353 of the input image 351 is inputted to a purple degree calculation section 305, by which a purple degree [Pr] 358 is calculated based on the color difference component [C] 353. The calculated purple degree [Pr] 358 is outputted to the false color degree calculation section 306.

The false color degree calculation section 306 receives the purple degree [Pr] 358 and the overexposed highlight degree [Wr] 357 as inputs thereto and calculates a false color degree [PFr] 359 and outputs the calculated false color degree [PFr] 359 to the saturation reduction rate calculation section 307.

The saturation reduction rate calculation section 307 receives the false color degree [PFr] 359 and the directional gain [Dr] 360 as inputs thereto and calculates a saturation reduction rate [R] 361 based on the input values. The saturation reduction rate calculation section 307 outputs the saturation reduction rate [R] 361 to the components of the correction processing section 310, that is, a pixel saturation reduction processing section 311, a pixel saturation correction processing section 312 and a pixel color difference component blurring processing section 313.

The pixel saturation reduction processing section 311 receives the color difference component [C] 353 of the input image 351 as an input thereto and performs a saturation reduction process for a false color (PF) pixel portion based on the saturation reduction rate [R] 361 inputted from the correction parameter (saturation reduction rate) calculation section 300. The pixel saturation reduction processing section 311 outputs a false color (PF) portion saturation reduction result image [Cs] 362 to the pixel saturation correction processing section 312.

The pixel saturation correction processing section 312 receives the false color (PF) portion saturation reduction result image [Cs] 362 from the pixel saturation reduction processing section 311 and executes correction of the saturation reduction amount. In particular, the pixel saturation correction processing section 312 detects a portion for which the saturation has been reduced excessively by the pixel saturation reduction processing section 311 and performs a saturation correction process with reference to the saturations of peripheral pixels.

The pixel saturation correction processing section 312 selects a pixel for which the saturation reduction process has been executed by the pixel saturation reduction processing section 311, that is, a pixel principally decided as a false color (PF) pixel, as an object of correction and performs a correction process for the selected pixel. In particular, since the object range of the saturation correction is a portion whose saturation has been reduced, it is necessary to select a pixel whose saturation reduction rate [R] 361 is not equal to 0. To this end, the pixel saturation correction processing section 312 receives the saturation reduction rate [R] 361 as an input thereto and selects any pixel whose saturation reduction rate [R] 361 is not equal to 0, and performs saturation correction for the selected pixel.

The pixel saturation correction processing section 312 outputs a saturation correction image [Cc] 363, which is an image of a result of execution of the saturation correction, to the pixel color difference component blurring processing section 313. The pixel color difference component blurring processing section 313 executes a process of applying blurring to multiplying color difference signals of the saturation correction image [Cc] 363, that is, a blurring process. Also the blurring process is not performed for all pixels, but a region including a pixel for which the saturation reduction and correction processes have been performed is selected as a processing object, and the blurring process is executed for the selected processing object region. The pixel color difference component blurring processing section 313 receives the saturation reduction rate [R] 361 for selection of a processing object region and selects those pixels whose saturation reduction rate [R] 361 is not equal to 0 to determine a processing object region for the blurring process, and then performs the blurring process for the blurring processing object region.

The pixel color difference component blurring processing section 313 executes the blurring process to produce and output a correction color difference component image [Ctemp] 364 as a correction result. The correction color difference component image [Ctemp] 364 is synthesized with the luminance component [Y] 365 and outputted as the final YCbCr output image 371. The YCbCr output image 371 as a result of the correction process is stored into the memory of the image processing apparatus and/or outputted to the outputting section such as the monitor section.

Figure 5:
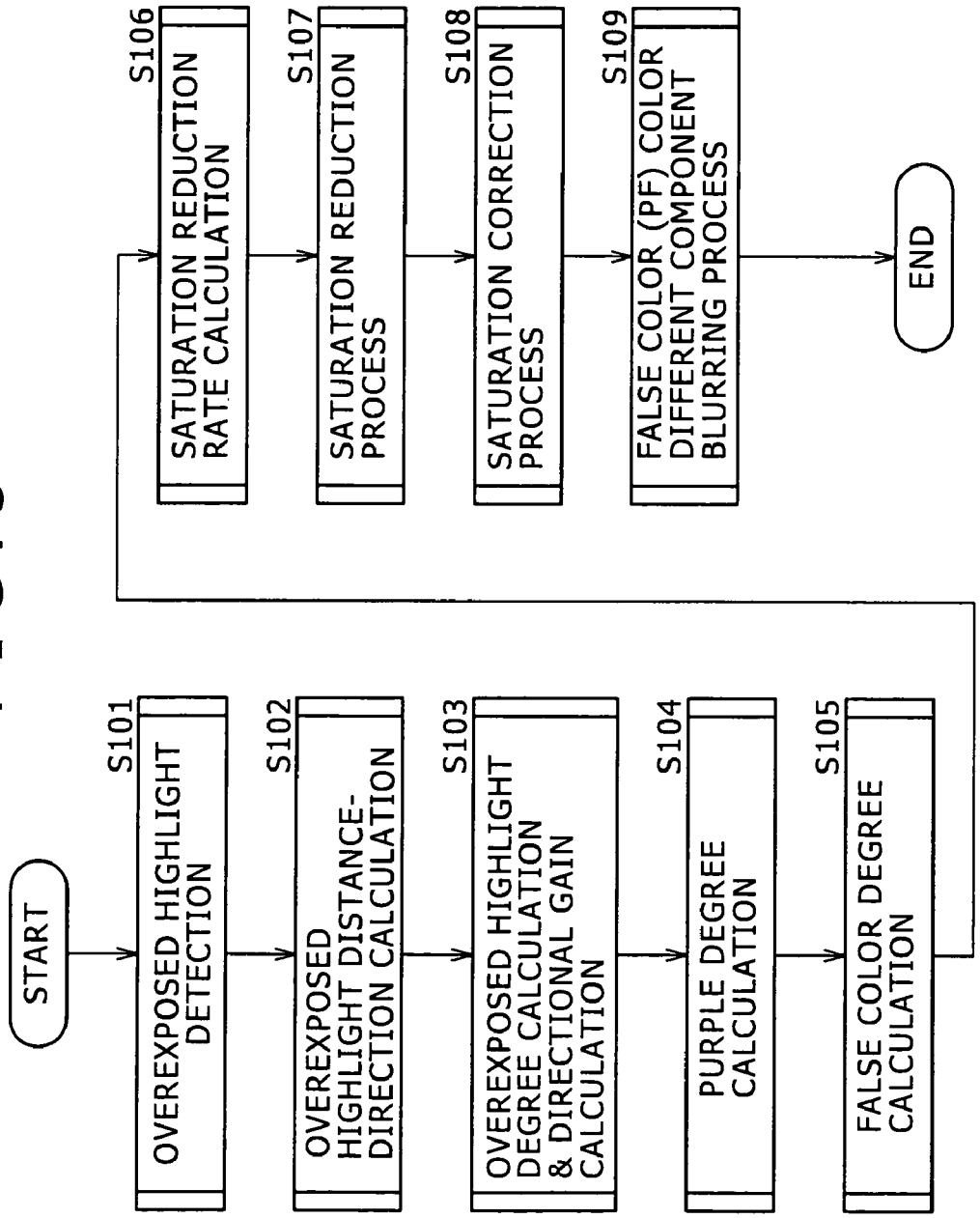
FIG. 5 is a flow chart illustrating a processing procedure of the false color (PF) correction processing section of FIG. 4.

FIG. 5 illustrates a processing procedure of a series of processes executed by the false color (PF) correction processing section 206 described hereinabove. Processes at step S101 to S106 correspond to the processes by the correction parameter (saturation reduction rate) calculation section 300, and processes at steps S107 to S109 correspond to the processes by the correction processing section 310.

At step S101, the overexposed highlight detection process is performed by the overexposed highlight detection section 301 of the correction parameter (saturation reduction rate) calculation section 300. At step S102, the overexposed highlight distance-direction vector calculation process is executed by the overexposed highlight distance-direction vector calculation section 302. At step S103, the overexposed highlight degree calculation process is executed by the overexposed highlight degree calculation section 303 and the direction gain calculation process is executed by the directional gain calculation section 304. At step S104, the purple degree calculation process is executed by the purple degree calculation section 305. At step S105, the false color degree calculation process is executed by the false color degree calculation section 306. At step S106, the saturation reduction rate calculation process is executed by the saturation reduction rate calculation section 307.

At step S107, the false color (PF) pixel saturation reduction process is executed by the pixel saturation reduction processing section 311 of the correction processing section 310. At step S108, the false color (PF) pixel saturation correction process is executed by the pixel saturation correction processing section 312. At step S109, the false color (PF) pixel color difference component blurring process is executed by the pixel color difference component blurring processing section 313. As a result of execution of the processing steps described above, a YCbCr output image 371 as final correction image data is produced and outputted.

In the following, details of the processes of the components of the false color (PF) correction processing section 206 are described. It is to be noted that the image data of the processing object are image frame data of an image of a horizontal dimension="width" and a vertical dimension="height", and data corresponding to component pixels are successively inputted along a scanning line of the image frame data and a correction process is performed for the inputted data.

First, a process of the correction parameter (saturation reduction rate) calculation section 300 is described. As described hereinabove, the correction parameter (saturation reduction rate) calculation section 300 calculates a false color (PF) degree and a saturation reduction rate as a correction parameter based on the calculated false color degree. The false color (PF) degree is calculated for each of the component pixels of the image data and calculated based on the distance of each pixel from an overexposed highlight pixel and a similarity of the hue of each pixel to the hue of the false color (purple fringe). In the present embodiment, it is estimated that a pixel which is positioned near to an overexposed highlight pixel and exhibits a purple color is a false color (PF) (purple fringe) pixel. Accordingly, the false color (PF) degree has a higher value as the distance from the overexposed highlight pixel is shorter and as the hue is nearer to a purple color.

Overexposed Highlight Detection Section 301

Figure 6:
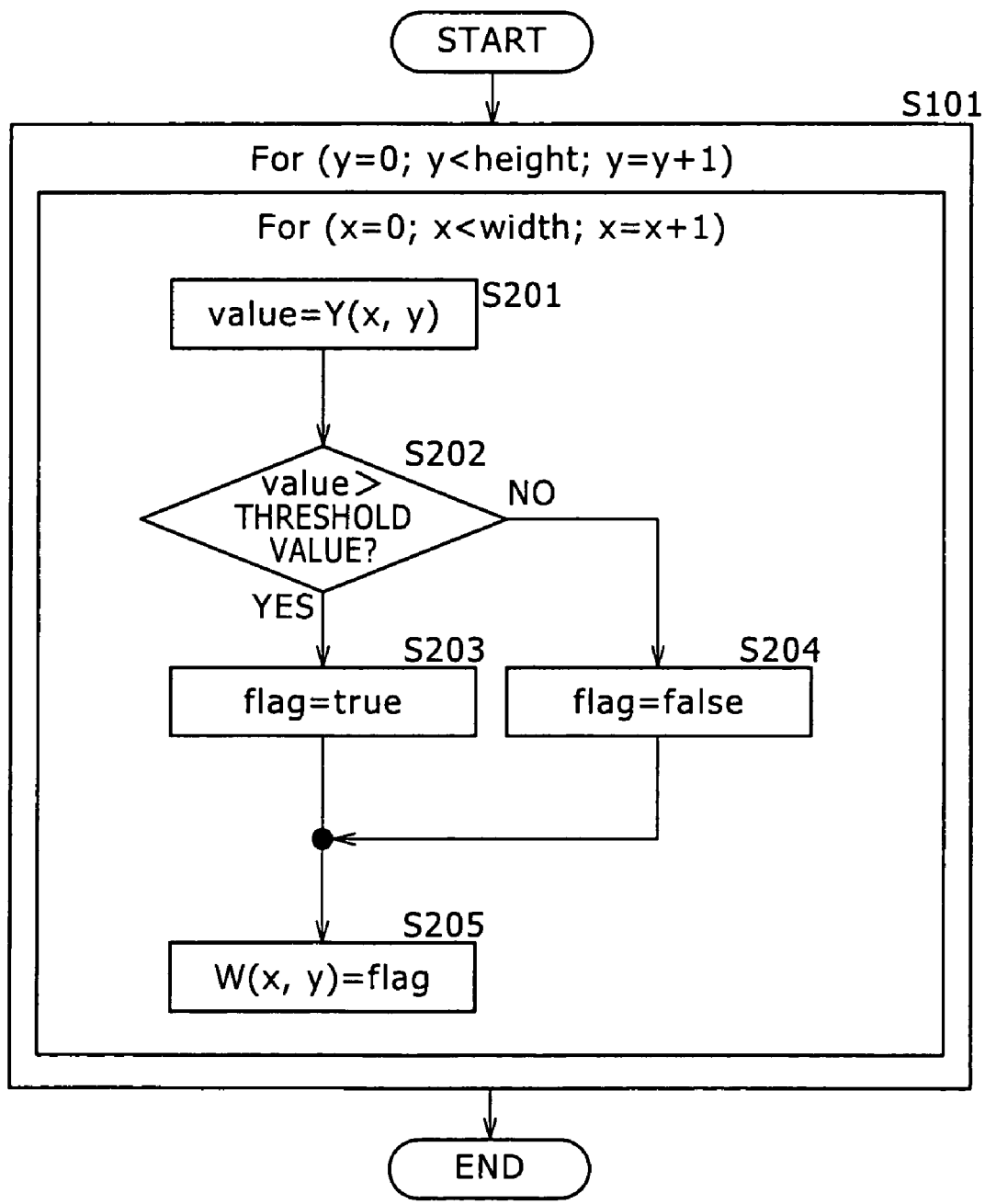
FIG. 6 is a flow chart illustrating a processing procedure of an overexposed highlight detection process executed by the false color (PF) correction processing section of FIG. 4.

The overexposed highlight detection section 301 of the correction parameter (saturation reduction rate) calculation section 300 uses the luminance component [Y] 352 to perform an overexposed highlight detection process and outputs an overexposed highlight detection map [W] 354. FIG. 6 illustrates a processing procedure executed by the overexposed highlight detection section 301. The process executed by the overexposed highlight detection section 301 is described below with reference to the flow chart of FIG. 6. The flow illustrated in FIG. 6 indicates a process corresponding to the process at step S101 of the flow chart of FIG. 5.

The processing flow shown in FIG. 6 indicates two frameworks, of which the outer one is denoted by For (y=0; y<height; y=y+1) and the inner one is denoted by For (x=0; x<width; x=x+1).

The inner framework which include steps S201 to S205 is executed as processes for For (x=0; x<width; x=x+1)

along the x axis which is a scanning line for the image data and signifies that the processes at steps S201 to S205 are executed for each of the pixels of 0 to "width" along the x axis. After the processes for one scanning line are ended, the processes for a next scanning line are executed similarly. This is executed as processes for For (y=0; y<height; y=y+1)

as indicated in the outer framework in FIG. 6 and signifies that the scanning line is successively shifted by one line along the y axis perpendicular to the scanning line and the processes of For (x=0; x<width; x=x+1), that is, the processes at steps S201 to S205, are executed for the pixels of 0 to "width" along the x axis. As a result, the processes at steps S201 to S205 are executed successively for all component pixels of (x=0 to "width", y=0 to "height") of the image frame.

The processes at the individual steps are described. At step S201, the overexposed highlight detection section 301 acquires the luminance value of each pixel from the luminance component [Y] 352 inputted thereto. The noticed pixel is a pixel (x, y), and the luminance value of the noticed pixel (x, y) is represented by Y(x, y). At step S202, the overexposed highlight detection section 301 compares the luminance value Y(x, y) of the noticed pixel with a threshold value set in advance.

At steps S203 to S205, if the luminance value Y(x, y)=value of the noticed pixel (x, y) is higher than the threshold value, then a flag "flag" for the noticed pixel (x, y) is set to "flag"=[true], but otherwise, the flag is set to "flag"=[false]. Then, the overexposed highlight detection section 301 sets an overexposed highlight detection map [W] 354. This is determined for all of the pixels (x=0 to "width", y=0 to "height") which form the image of the horizontal width="width" and the vertical height="height", and the overexposed highlight detection map [W] 354 wherein the flag (true or false) corresponding to each pixel is set is completed. The completed overexposed highlight detection map [W] 354 is outputted to the overexposed highlight distance-direction vector calculation section 302.

Overexposed Highlight Distance-Direction Vector Calculation Section 302

The overexposed highlight distance-direction vector calculation section 302 receives the overexposed highlight detection map [W] 354 as an input thereto and performs a calculation process of the distance and the direction vector of the noticed pixel (x, y) from an overexposed highlight pixel. Then, the overexposed highlight distance-direction vector calculation section 302 outputs a distance [Wi] 355 to the overexposed highlight pixel nearest to the noticed pixel (x, y), that is, to the nearest overexposed highlight, and a direction vector [WDirect] 356 representative of a direction in which the nearest overexposed highlight to the noticed pixel (x, y) is present. The process of the overexposed highlight distance-direction vector calculation section 302 is described with reference to FIG. 7. The flow illustrated in FIG. 7 indicates a process corresponding to the process at step S102 of the flow chart of FIG. 5.

Figure 7:
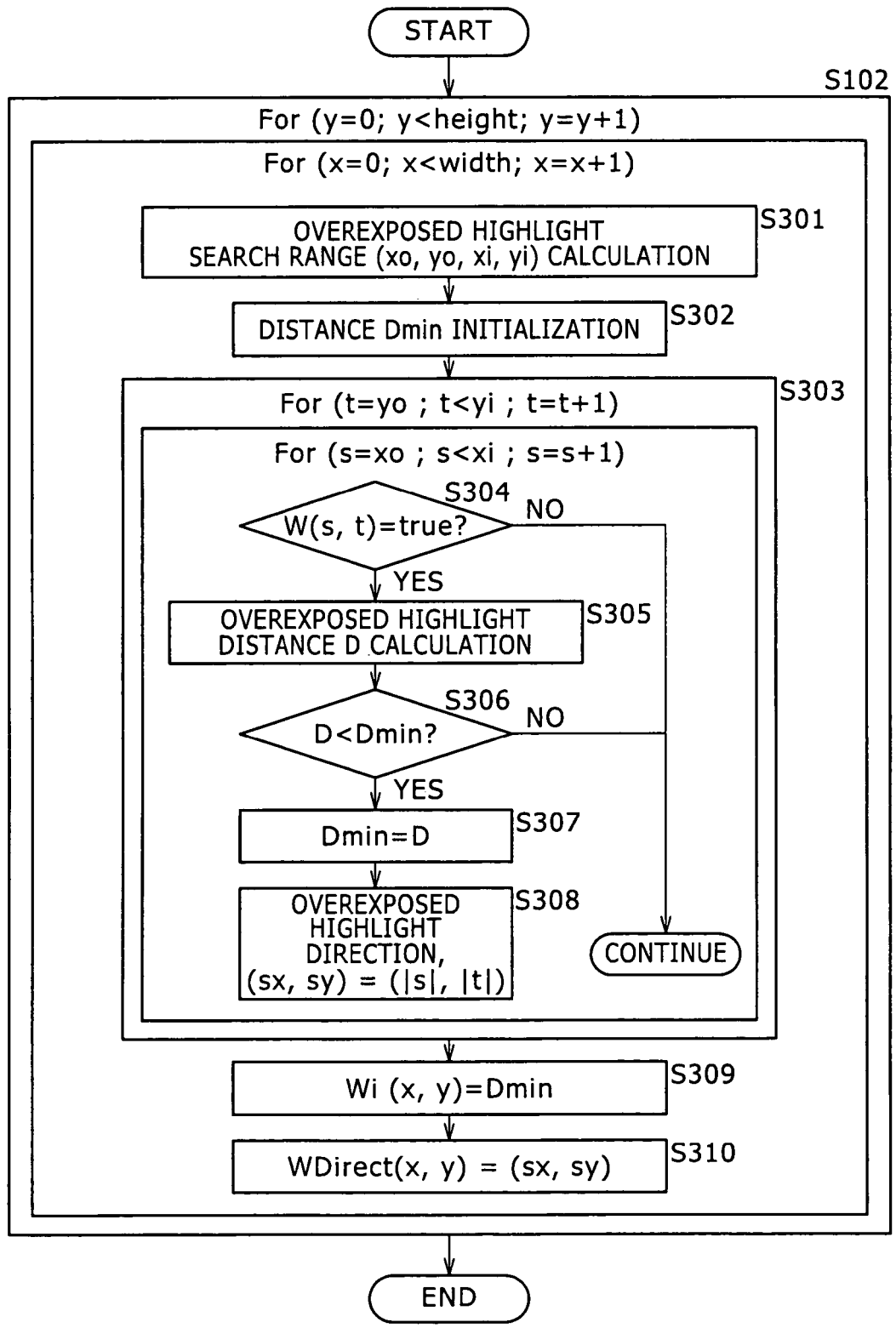
FIG. 7 is a flow chart illustrating a processing procedure of an overexposed highlight distance-direction vector calculation process executed by the false color (PF) correction processing section of FIG. 4.

It is to be noted that also the processing flow illustrated in FIG. 7 has two frameworks similar to those of the flow of FIG. 6, that is, an outer framework denoted by For (y=0; y<height; y=y+1) and an inner framework denoted by For (x=0; x<width; x=x+1), and processes at the steps are successively executed for the component pixels of (x=0 to width, y=0 to height) of the processing object image frame.

First at step S301, calculation of an overexposed highlight search range ($x_0$, $y_0$, $x_1$, $y_1$) corresponding to the noticed pixel (x, y) is performed. A setting process of the overexposed highlight search range ($x_0$, $y_0$, $x_1$, $y_1$) corresponding to the noticed pixel (x, y) is a process for setting a search region in which an overexposed highlight pixel may possibly exist in a neighboring region of the noticed pixel (x, y). Details of this process are hereinafter described.

At step S302, a variable [Dmin] representative of the shortest distance between the noticed pixel (x, y) and the overexposed highlight pixel is initialized. Thereafter, the processing advances to step S303, at which processes at steps S304 to S308 are executed to perform detection of an overexposed highlight pixel within the overexposed highlight search range ($x_0$, $y_0$, $x_1$, $y_1$) set for the noticed pixel (x, y) to determine the variable [Dmin] between the noticed pixel (x, y) and the overexposed highlight pixel and the direction (sx, sy)=(|s|, |t|) from the noticed pixel (x, y) to the overexposed highlight pixel. It is to be noted that the process at step S303, that is, the processes at steps S304 to S308, are successively executed for the component pixels (s=$x_0$ to $x_1$, y=$y_0$ to $y_1$) in the overexposed highlight search range ($x_0$, $y_0$, $x_1$, $y_1$)).

The processes at steps S304 to S308 are described. At step S304, an overexposed highlight search is performed within the overexposed highlight search range ($x_0$, $y_0$, $x_1$, $y_1$) set at step S301. The overexposed highlight search is executed based on the overexposed highlight detection map [W] 354 produced by the overexposed highlight detection section 301. At step S304, a flag W(s, t) for the YCbCr input image 351 regarding the selected pixel (s, t) successively selected from within the overexposed highlight search range ($x_0$, $y_0$, $x_1$, $y_1$) is decided.

Where the flag W(s, t)="true", the selected pixel (s, t) is an overexposed highlight pixel, but where the flag W(s, t)="false", the selected pixel (s, t) is not an overexposed highlight pixel. If the flag W(s, t)="true" and the selected pixel (s, t) is an overexposed highlight pixel, then the processing advances to step S305, at which the distance [D] between the noticed pixel (x, y) and the selected pixel (s, t) is calculated. Then at step S306, the overexposed highlight distance-direction vector calculation section 302 executes comparison of the distance [D] with the variable [Dmin]. If the distance [D] is smaller than the variable [Dmin], then the overexposed highlight distance-direction vector calculation section 302 executes an updating process of the variable [Dmin] at step S307. Further at step S308, the overexposed highlight distance-direction vector calculation section 302 determines the direction vector (sx, sy)=(|s|, |t|) from the noticed pixel (x, y) to the overexposed highlight pixel at the shortest distance.

The processes described above are executed for all pixels (x=0 to "width", y=0 to "height") which compose the image of the horizontal width="width" and the vertical height="height". Then at step S309, the distance [Wi(x, y)=Dmin] 355 to the nearest overexposed highlight is produced, and at step S310, the direction vector [WDirect(x, y)=(sx, sy)] 356 in which the nearest overexposed highlight exists is calculated.

The distance [Wi(x, y)=Dmin] 355 to the nearest overexposed highlight is outputted to the overexposed highlight degree calculation section 303 while the direction vector [WDirect(x, y)=(sx, sy)] 356 to the nearest overexposed highlight is outputted to the directional gain calculation section 304.

Now, details of the processing steps of the overexposed highlight distance-direction vector calculation section 302 illustrated in the flow chart of FIG. 7 are described. First, details of the process at step S301, that is, details of the calculation process for an overexposed highlight search range ($x_0$, $y_0$, $x_1$, $y_1$) corresponding to a noticed pixel (x, y), are described with reference to FIG. 8. As described hereinabove, the setting process for the overexposed highlight search range ($x_0$, $y_0$, $x_1$, $y_1$) corresponding to the noticed pixel (x, y) is a process of setting a search region for an overexposed highlight pixel which may possibly exist in a neighboring region of the noticed pixel (x, y). While false color (PF) pixels appear in the proximity of and around a portion at which an overexposed highlight appears, the range within which such false color (PF) pixels appear differs depending upon the position of the overexposed highlight on the image.

For example, a false color (PF) is more liable to appear toward a direction from a central portion of an image which is the optical center to an end of the image, and a larger false color (PF) portion sometimes appears toward that direction. The characteristic of the range within which a false color (PF) appears differs also depending upon the type of the optical system, setting of the iris, focal length and so forth and the position of the noticed pixel.

Figure 8:
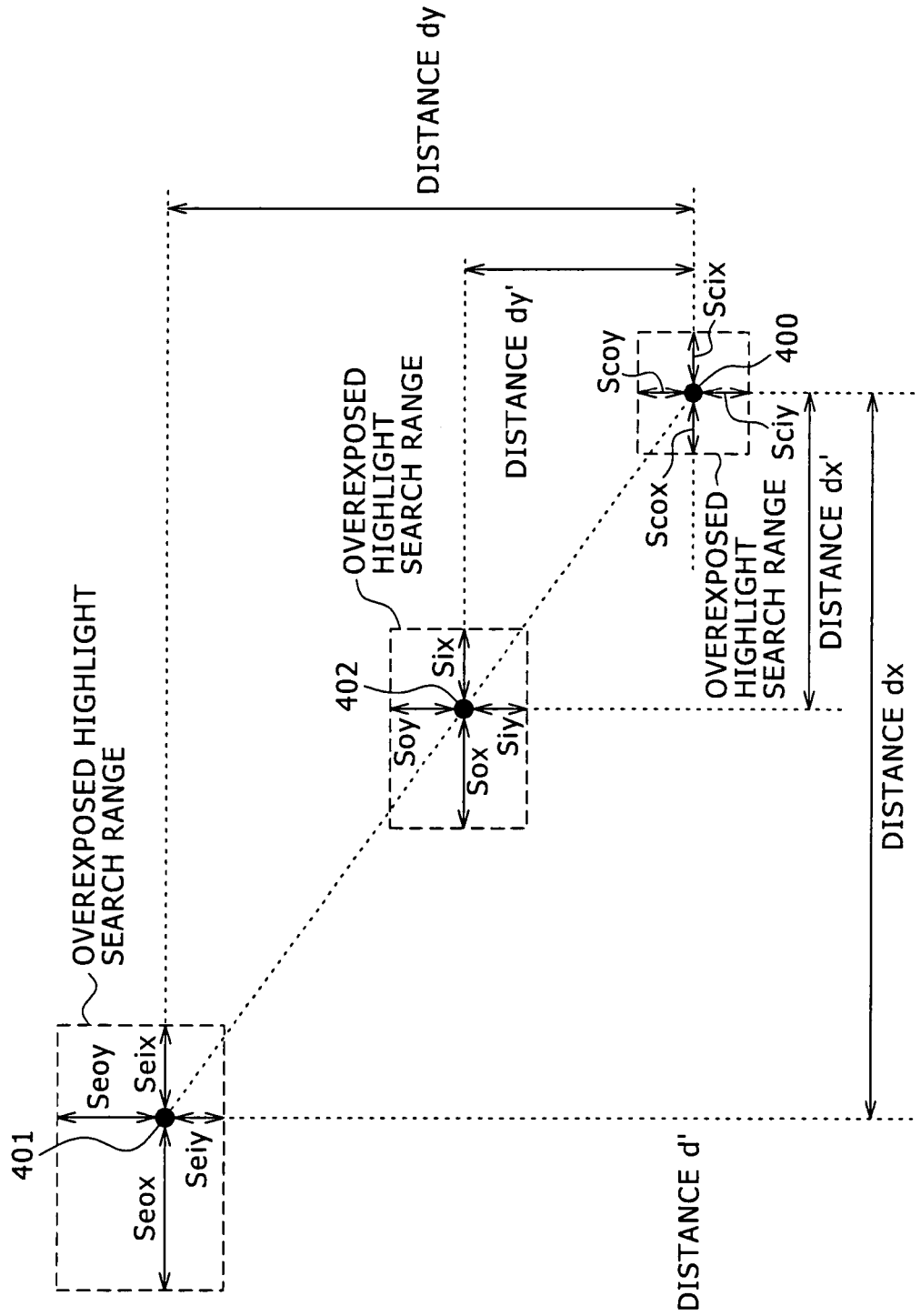
FIG. 8 is a diagrammatic view illustrating details of a calculation process for an overexposed highlight search range by the overexposed highlight distance-direction vector calculation section shown in FIG. 4.

In the present embodiment, if the noticed pixel (x, y) is a false color (PF) pixel, then calculation of the overexposed highlight search range ($x_0$, $y_0$, $x_1$, $y_1$) corresponding to the noticed pixel (x, y) is executed at step S301 in the flow of FIG. 7. While various methods are available for the setting of an overexposed highlight search range, in the present embodiment, an overexposed highlight search range (Scox, Scoy, Scix, Sciy) which corresponds to an image center pixel 400 located at a central portion of a processing object image (width="width", height="height") and another overexposed highlight search range (Seox, Seoy, Seix, Seiy) corresponding to an image end pixel 401 at an image end portion are set in advance as seen in FIG. 8 and retained as table data. Further, the overexposed highlight search range ($x_0$, $y_0$, $x_1$, $y_1$)=(Sox, Soy, Six, Siy) corresponding to a noticed pixel (x, y) 402 is calculated based on the overexposed highlight search range data corresponding to the image central pixel and the image end pixel set as the table data in response to the pixel position of the noticed pixel (x, y).

A particular calculation process of the overexposed highlight search range ($x_0$, $y_0$, $x_1$, $y_1$)=(Sox, Soy, Six, Siy) corresponding to the noticed pixel (x, y) is described. The overexposed highlight search range ($x_0$, $y_0$, $x_1$, $y_1$)=(Sox, Soy, Six, Siy) is determined using the following expressions (1):

$$Sox = Scox \times \frac{dx - dx'}{dx} + Seox \times \frac{dx'}{dx} \qquad (1)$$

$$Soy = Scoy \times \frac{dy - dy'}{dy} + Seoy \times \frac{dy'}{dy}$$

-continued $$Six = Scix \times \frac{dx - dx'}{dx} + Seix \times \frac{dx'}{dx}$$

$$Siy = Sciy \times \frac{dy - dy'}{dy} + Seiy \times \frac{dy'}{dy}$$

where Scox, Scoy, Scix and Sciy are the overexposed highlight search range (Scox, Scoy, Scix, Sciy) at a central portion of the processing object image (width="width", height="height"), and Seox, Seoy, Seix and Seiy are the overexposed highlight search range (Seox, Seoy, Seix, Seiy) at the image end portion.

Further, dx and dy are the distance from the image center to the image end, and dx=width/2 and dy=height/2. Further, dx' and dy' are the distance from the image center to the noticed pixel (x, y), and dx'=|x−width/2| and dy'=|y−height/2|.

It is to be noted, however, that, while the calculation process of an overexposed highlight search range may be configured such that, when the noticed pixel is changed, calculation based on the expressions (1) above is performed sequentially, it may otherwise be configured such that, when the noticed pixel is changed, the calculation based on the expressions (1) is not executed, but the overexposed highlight search range data corresponding to the preceding noticed pixel are utilized to determine the overexposed highlight search range corresponding to the next noticed pixel. In particular, the calculation process of an overexposed highlight search range may be configured such that the overexposed highlight search range data corresponding to the next search pixel are calculated by adding only a variation amount for the overexposed highlight search range data corresponding to the preceding noticed pixel.

For example, as regards [Sox] which is one of component data of the overexposed highlight search range $(x_0, y_0, x_1, y_1)$=(Sox, Soy, Six, Siy) corresponding to the noticed pixel (x, y), according to the expressions (1) given hereinabove, [Sox] is incremented or decremented by 1 for each (dx/(Scox−Seox)). Accordingly, (dx/(Scox−Seox)) is calculated in advance, and the value of [Sox] set to the overexposed highlight search range calculated already should be varied by one. Also the other values Soy, Six and Siy can be calculated by a similar process. Where the configuration that overexposed highlight range data corresponding to a preceding noticed pixel are utilized to determine an overexposed highlight search range corresponding to a next noticed pixel in this manner is used, an efficient process which reduces the calculation load can be anticipated.

Figure 9:
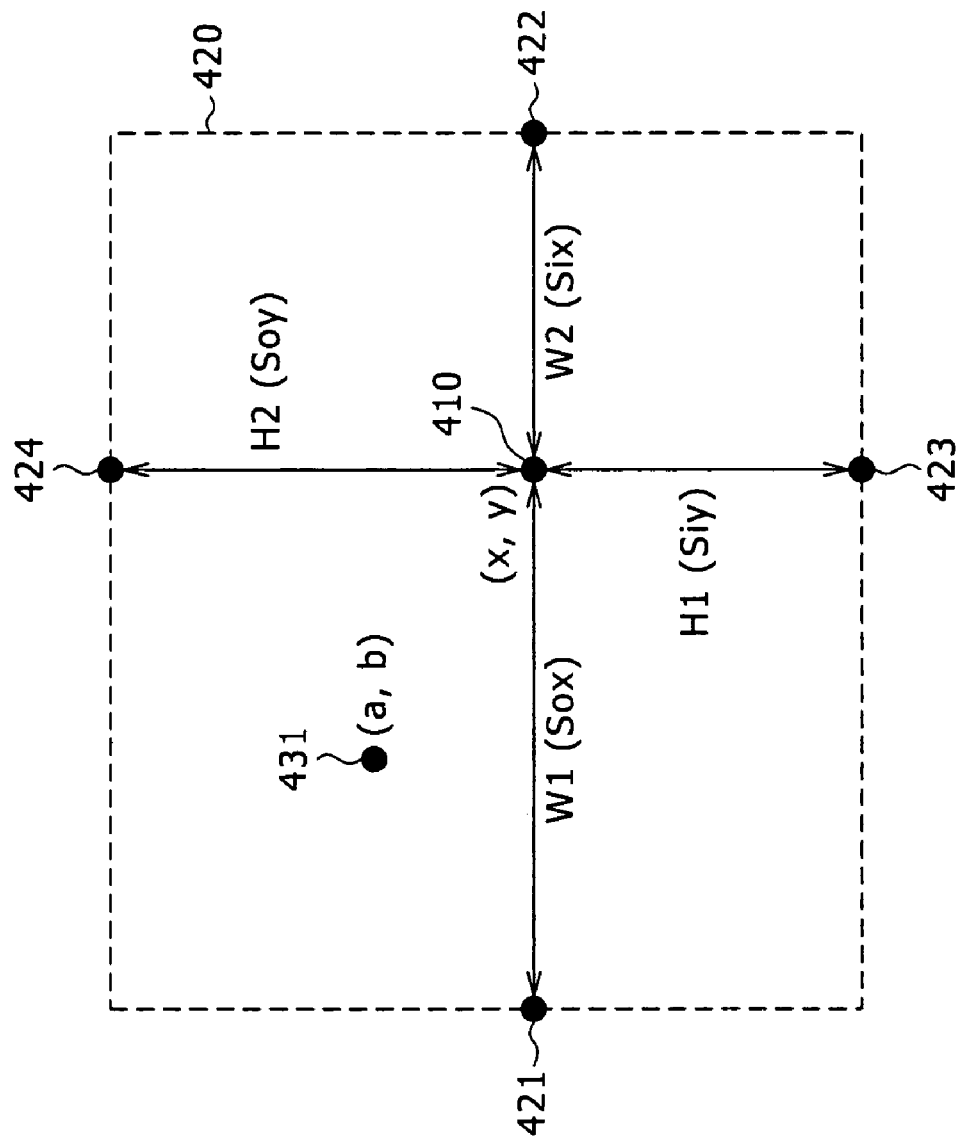
FIG. 9 is a diagrammatic view illustrating details of an overexposed highlight distance calculation process by the overexposed highlight distance-direction vector calculation section shown in FIG. 4.

Now, details of the overexposed highlight distance calculation process at step S305 in the flow chart of FIG. 7 are described with reference to FIG. 9. When the distance from a noticed pixel to an overexposed highlight pixel is to be calculated, it is necessary to take the direction in which a false color (PF) appears into consideration similarly as in the search range setting process for an overexposed highlight pixel. FIG. 9 illustrates an overexposed highlight search range 420 for a noticed pixel (x, y) 410.

The overexposed highlight presence possibilities at four points of pixels 421 to 424 of the overexposed highlight search range 420 corresponding to the noticed pixel (x, y) 410 shown in FIG. 9, that is, $(x_0, y_0, x_1, y_1)$=(Sox, Soy, Six, Siy), are substantially equal to each other. As described hereinabove, false color (PF) pixels appear in the proximity of and around a portion at which an overexposed highlight appears. However, as described hereinabove, while false color (PF) pixels appear in the proximity of and around a portion at which an overexposed highlight appears, the range within which such false color (PF) pixels appear differs depending upon the position of the overexposed highlight on the image, and a false color (PF) is more liable to appear toward a direction from a central portion of an image which is the optical center to an end of the image and there is a tendency of a larger false color (PF) portion toward that direction. The overexposed highlight search range 420 of FIG. 9 is an overexposed highlight search range set corresponding to the noticed pixel (x, y) 410 which is a false color (PF) pixel. Accordingly, the overexposed highlight search range 420 is not set in a region around the noticed pixel (x, y) 410.

The overexposed highlight search range 420 is set as a region in which the overexposed highlight presence possibilities at the four points of the pixels 421 to 424 at the ends of the overexposed highlight search range 420 are substantially equal to each other.

In the overexposed highlight distance calculation process at step S305 of the flow chart of FIG. 7, in the calculation of the distance [D] between the noticed pixel (x, y) 410 and an overexposed highlight pixel (a, b) 431, not an actual distance is calculated, but the absolute value of the difference between the x coordinates of the overexposed highlight position and the noticed pixel is normalized using Sox or Six and the absolute value of the difference between the y coordinates of the overexposed highlight pixel portion position and the noticed pixel using Soy or Siy to calculate the distance d.

The distance calculation process based on normalization corresponds to the calculation of the distance d based on a supposition that the distances from the noticed pixel (x, y) 410 to the pixels 421 to 424 at the ends of the overexposed highlight search range 420 in FIG. 9 are equal to one another, that is, Sox=Soy=Six=Siy.

The distance d between the noticed pixel (x, y) 410 and the overexposed highlight pixel (a, b) 431 shown in FIG. 9 is determined in accordance with the following expression (2):

$$d = dx + dy \quad (2)$$

where dx and dy are values calculated in accordance with the following expressions:

$$dx = \frac{|a - x|}{W1} \quad \text{(where } a < x\text{)}$$

$$dx = \frac{|a - x|}{W2} \quad \text{(where } a \geq x\text{)}$$

$$dy = \frac{|b - y|}{H1} \quad \text{(where } b < y\text{)}$$

$$dy = \frac{|b - y|}{H2} \quad \text{(where } b \geq y\text{)}$$

where x, y and a, b are coordinate values of the noticed pixel (x, y) and the overexposed highlight pixel (a, b), and W1, W2 and H1, H2 are distances from the noticed pixel (x, y) of the overexposed highlight search range set corresponding to the noticed pixel (x, y) to the overexposed highlight search range boundaries. In other words, W1, W2 and H1, H2 represent the distances shown in FIG. 9, and in particular, W1 and W2 represent the values of the two distances in the x direction and H1 and H2 represent the values of the two distances in the y direction.

In the distance calculation process at step S305 of the flow chart of FIG. 7, the distance between the noticed pixel (x, y) and the overexposed highlight pixel (a, b) is calculated in accordance with the expression (2) given hereinabove. It is to be noted that the distance calculated in accordance with the expression (2) is called Manhattan distance, and here, the Manhattan distance is determined for simplified calculation. Not the Manhattan distance but the distance: $\sqrt{(d_x^2+d_y^2)}$ between the noticed pixel (x, y) and the overexposed highlight pixel (a, b) may be determined instead.

The distance d calculated in accordance with the expression (2) has a value of d=0.0 to 1.0, and where d=0.0, an overexposed highlight is nearest to the noticed pixel, but where d=1.0, the distance is long.

The overexposed highlight direction vector calculation process at step S308 of the flow of FIG. 7 is described below. The process at step S308 is to determine the direction vector (sx, sy)=(|s|, |t|) from the noticed pixel (x, y) to an overexposed highlight pixel at the short distance. At this step, in which direction (vertical, horizontal or oblique direction) an overexposed highlight exists with respect to the noticed pixel can be specified by determining the absolute values of the relative coordinate values from the position (x, y) of the noticed pixel to the position (a, b) of the overexposed highlight. For example, if the absolute value of the vertical position is higher than the absolute value of the horizontal position, then it can be decided that an overexposed highlight exists at least in an obliquely upward direction.

For example, if the position of the overexposed highlight at the shortest distance is (a, b) in relative position from the noticed pixel (x, y), then the vector in the overexposed highlight direction is (|a|, |b|). Here, |a| and |b| represent the absolute values of a and b, respectively.

As described hereinabove, the overexposed highlight distance-direction vector calculation section 302 shown in FIG. 4 receives the overexposed highlight detection map [W] 354 as an input thereto and executes processing in accordance with the flow of FIG. 7 to perform a process of calculating the distance and the direction vector of the noticed pixel (x, y) from the overexposed highlight pixel. Then, the overexposed highlight distance-direction vector calculation section 302 outputs the distance [Wi] 355 to the overexposed highlight pixel nearest to the noticed pixel (x, y), that is, the nearest overexposed highlight pixel, to the overexposed highlight degree calculation section 303 and outputs the direction vector [WDirect] 356 indicative of the direction in which the nearest overexposed highlight exists from the noticed pixel (x, y) to the directional gain calculation section 304.

Overexposed Highlight Degree Calculation Section 303

Now, details of the process of the overexposed highlight degree calculation section 303 are described. The overexposed highlight degree calculation section 303 receives the distance [Wi] 355 between the noticed pixel and the overexposed highlight pixel nearest to the noticed pixel as an input thereto and performs the overexposed highlight degree calculation process to calculate the overexposed highlight degree [Wr], and outputs the overexposed highlight degree [Wr] to the false color degree calculation section 306.

The overexposed highlight degree calculation section 303 receives the distance [Wi] 355 to the nearest overexposed highlight pixel produced by the overexposed highlight distance-direction vector calculation section 302 as an input thereto and performs data conversion applying a lookup table (LUT) based on the inputted distance [Wi] data values to calculate the overexposed highlight degree [Wr], and outputs the overexposed highlight degree [Wr] to the false color degree calculation section 306. The process corresponds to the process of the overexposed highlight degree calculation section 303 included in the process at step S103 of the flow chart of FIG. 5. An example of a graph which represents the lookup table (LUT) to be applied by the overexposed highlight degree calculation section 303 is shown in FIG. 10.

Figure 10:
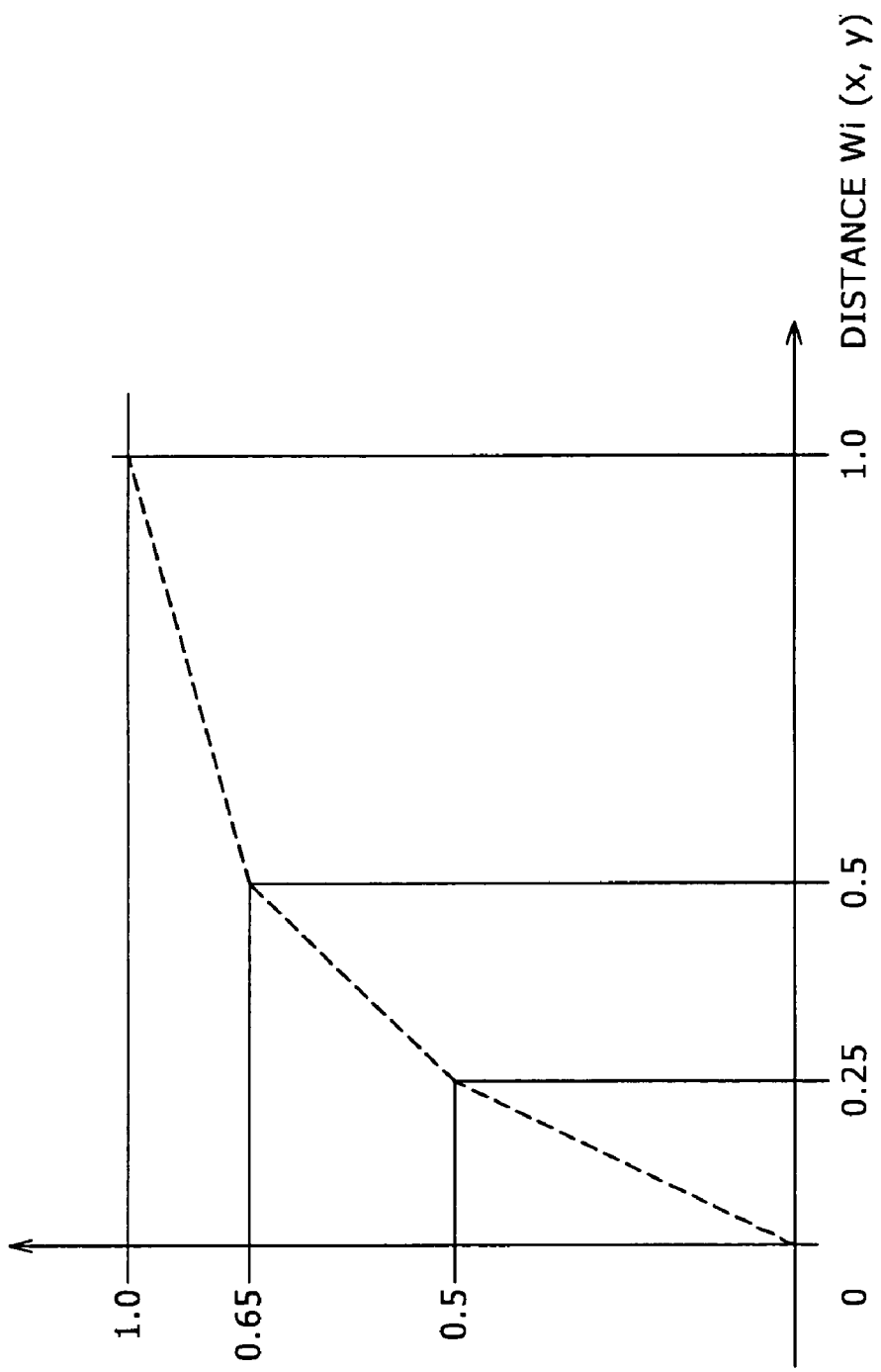
FIG. 10 is a diagram illustrating a lookup table used by a direction gain calculation section shown in FIG. 4.

Referring to FIG. 10, the axis of abscissa indicates the distance [Wi] data to the nearest overexposed highlight pixel inputted from the overexposed highlight distance-direction vector calculation section 302, and the axis of ordinate indicates the overexposed highlight degree [Wr] to be outputted to the false color degree calculation section 306. The distance [Wi] data and the overexposed highlight degrees [Wr] correspond in a one by one corresponding relationship to each other, and the overexposed highlight degree calculation section 303 acquires a corresponding value of the overexposed highlight degree [Wr] based on the distance [Wi] data to the nearest overexposed highlight pixel inputted from the overexposed highlight distance-direction vector calculation section 302. For example, where the lookup table (LUT) shown in FIG. 10 is applied, the overexposed highlight degree calculation section 303 acquires and outputs such a value of the overexposed highlight degree [Wr] as given below to the false color degree calculation section 306. In particular, where the distance [Wi] to the overexposed highlight pixel is [Wi]=0, the overexposed highlight degree [Wr]=0, where the distance [Wi] to the overexposed highlight pixel is [Wi]=0.25, the overexposed highlight degree [Wr]=0.5, where the distance [Wi] to the overexposed highlight pixel is [Wi]=0.5, the overexposed highlight degree [Wr]=0.65, or where the distance [Wi] to the overexposed highlight pixel is [Wi]=1.0, the overexposed highlight degree [Wr]=1.0 is acquired and outputted.

The process described above is executed for each pixel, and the overexposed highlight degree [Wr] corresponding to each pixel is calculated and outputted to the false color degree calculation section 306. It is to be noted that the lookup table (LUT) shown in FIG. 10 is a mere example and is set taking the manner of appearance of a false color (PF) into consideration. However, the lookup table to be used for the data conversion described above is not limited to the specific lookup table (LUT) shown in FIG. 10.

Directional Gain Calculation Section 304

Now, details of the process of the directional gain calculation section 304 are described. The directional gain calculation section 304 calculates a directional gain [Dr] based on the direction vector [WDirect] 356 outputted from the overexposed highlight distance-direction vector calculation section 302, that is, the direction vector [WDirect] 356 from the noticed pixel toward the nearest overexposed highlight pixel, and outputs the calculated directional gain [Dr] to the saturation reduction rate calculation section 307. The process of the directional gain calculation section 304 is described below with reference to a flow chart of FIG. 11. The flow illustrated in FIG. 11 corresponds to the process of the directional gain calculation section 304 included in the process at step S103 of the follow chart of FIG. 5.

The directional gain calculation section 304 receives a corresponding direction vector [WDirect(x, y)] for each noticed pixel (x, y) of the processing object image as an input thereto and outputs a directional gain [Dr(x, y)] corresponding to each pixel.

Figure 12:
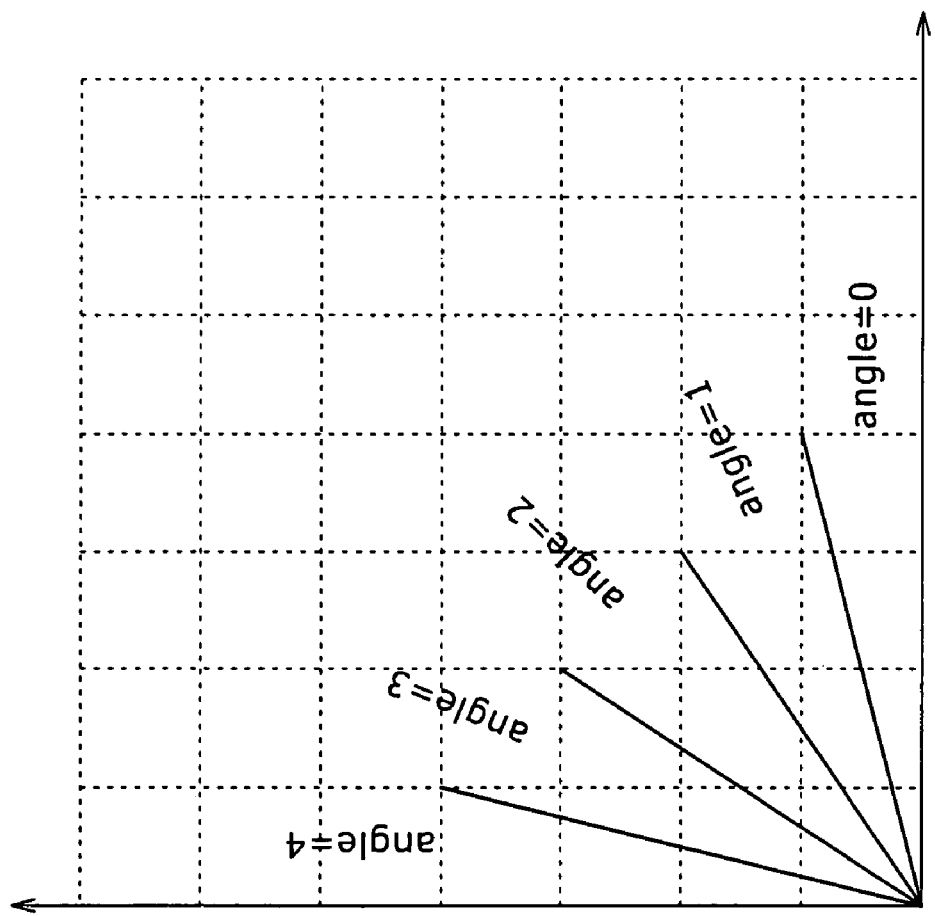
FIG. 12 is a diagram illustrating an example of classification of direction vectors of shortest distance overexposed highlight pixel positions individually corresponding to pixel positions into five different groups depending upon the direction or angle.

In the present embodiment, direction vectors [WDirect(x, y)] corresponding to pixels as input values are classified in such a manner as seen in FIG. 12. FIG. 12 illustrates an example wherein direction vectors [WDirect(x, y)] corresponding to the individual pixel positions (x, y) into five different vectors 0, 1, 2, 3 and 4 individually for different directions.

Referring to FIG. 12, the directional gain calculation section 304 classifies direction vectors [WDirect(x, y)] of the corresponding shortest overexposed highlight pixel positions for the individual pixel positions (x, y) of the processing object image inputted from the overexposed highlight distance-direction vector calculation section 302 into five directions. The processing procedure for the classification into the five directions is the processes at steps S401 to S410 in the flow of FIG. 11.

It is to be noted that also the processing flow illustrated in FIG. 11 has two frameworks similar to those of the other flows described hereinabove, that is, an outer framework denoted by For (y=0; y<height; y=y+1) and an inner framework denoted by For (x=0; x<width; x=x+1), and processes at the steps are successively executed for the component pixels of (x=0 to "width", y=0 to "height") of the processing object image frame.

Figure 11:
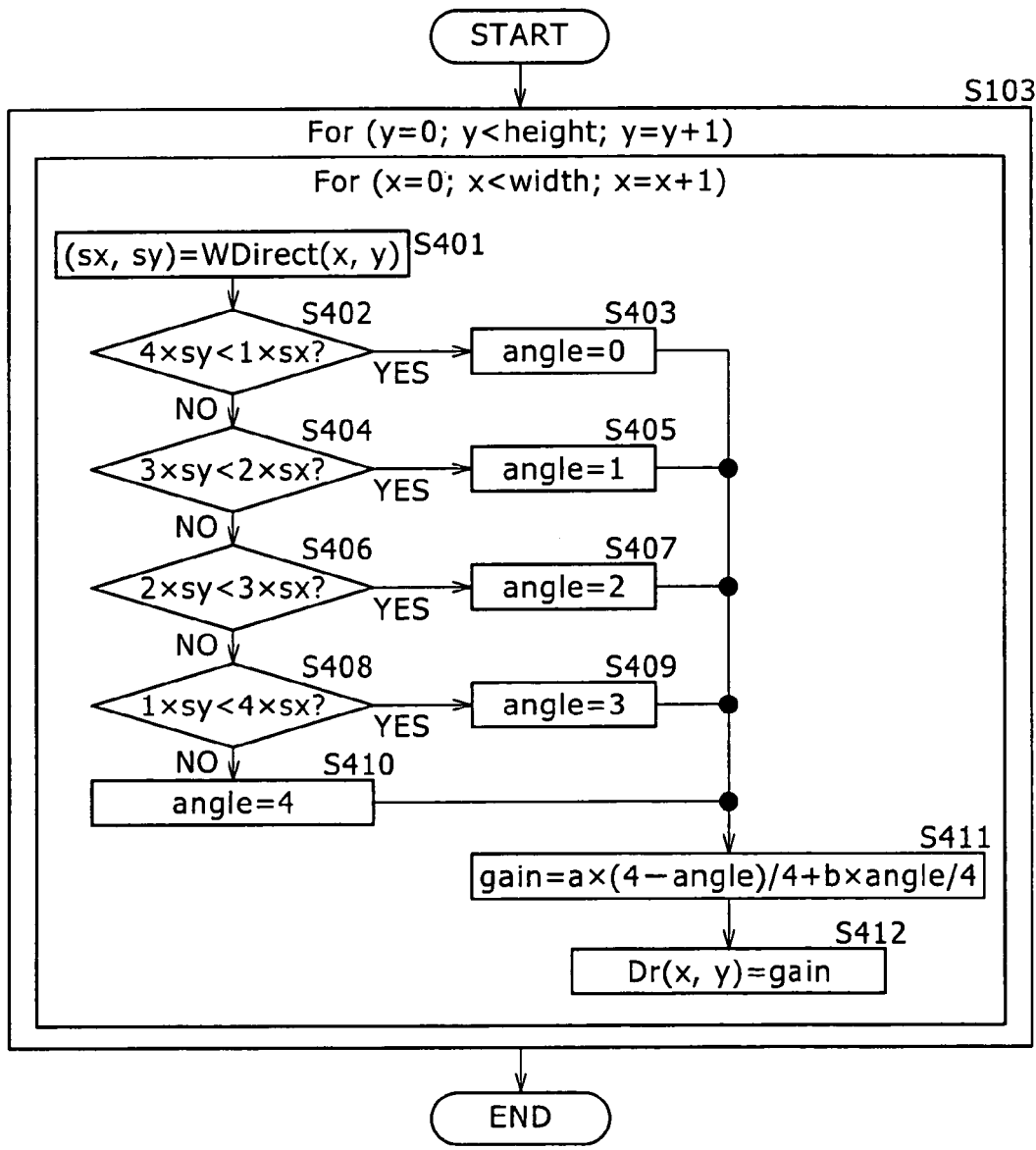
FIG. 11 is a flow chart illustrating a processing procedure executed by the direction gain calculation section shown in FIG. 4.

Referring to FIG. 11, at step S401, direction data of the direction vector [WDirect(x, y)] of the shortest overexposed highlight pixel position corresponding for each pixel position (x, y) are set as (sx, sy), and at step S402, it is decided whether or not 4×sy<1×sx is satisfied. If 4×sy<1×sx is satisfied, then the processing advances to step S403, at which it is decided that the direction angle is "angle"=0. This is a process at which it is decided that the direction vector [WDirect(x, y)] corresponding to the pixel position (x, y) is within the region of "angle"=0 in FIG. 12.

If the direction vector (sx, sy) of the noticed pixel does not satisfy 4×sy<1×sx at step S402, then the processing advances to step S404, at which it is decided whether or not 3×sy<2×sx is satisfied. If 3×sy<2×sx is satisfied, then the processing advances to step S405, at which it is decided that the direction angle is "angle"=1. This is a process in which it is decided that the direction vector [WDirect(x, y)] corresponding to the pixel position (x, y) is within the region of "angle"=1 in FIG. 12.

If the direction vector (sx, sy) of the noticed pixel does not satisfy 3×sy<2×sx at step S404, then the processing advances to step S406, at which it is decided whether or not 2×sy<3×sx is satisfied. If 2×sy<3×sx is satisfied, then the processing advances to step S407, at which it is decided that the direction angle is "angle"=2. This is a process in which it is decided that the direction vector [WDirect(x, y)] corresponding to the noticed pixel (x, y) is within the region of "angle"=2 in FIG. 12.

If the direction vector (sx, sy) of the noticed pixel does not satisfy 2×sy<3×sx at step S406, then the processing advances to step S408, at which it is decided whether or not 1×sy<4×sx is satisfied. If 1×sy<4×sx is satisfied, then the processing advances to step S409, at which it is decided that the direction angle is "angle"=3. This is a process in which it is decided that the direction vector [WDirect(x, y)] corresponding to the noticed pixel (x, y) is within the region of "angle"=3 in FIG. 12.

If the direction vector (sx, sy) of the noticed pixel does not satisfy 1×sy<4×sx at step S408, then the processing advances to step S410, at which it is decided that the direction angle is "angle"=4. This is a process in which it is decided that the direction vector [WDirect(x, y)] corresponding to the pixel position (x, y) is within the region of "angle"=4 in FIG. 12.

In this manner, the directional gain calculation section 304 executes, at steps S401 to S410, a process of classifying the direction vector [WDirect(x, y)] of the shortest white navigation pixel position corresponding to each pixel position (x, y) of a processing object image inputted from the overexposed highlight distance-direction vector calculation section 302 into one of the five directions ("angle"=0, 1, 2, 3 and 4).

Then, the processing advances to step S411, at which the directional gain [Dr(x, y)] corresponding to each noticed pixel (x, y) is calculated. The individual-direction gain calculation is executed in accordance with the following expression:

$$\text{gain} = a \times (4-\text{angle})/4 + b \times \text{angle}/4$$

where a is the saturation reduction rate where an overexposed highlight exists in the horizontal direction with respect to the noticed pixel, and b is the saturation reduction rate where the overexposed highlight exists in the vertical direction with respect to the noticed pixel. The values of a and b are set such that the saturation reduction ratio where an overexposed highlight exists in the horizontal direction with respect to the noticed pixel is higher than that where an overexposed highlight exists in the vertical direction with respect to the noticed pixel. In other words, the values of a and b are set so as to satisfy $$a > b$$

in advance. However, they also satisfy $$0 \leq a \leq 1 \text{ and } 0 \leq b \leq 1$$

The "angle" in the expression hereinabove assumes one of 0 to 4 determined in the processes at steps S401 to S410, that is, one of 0, 1, 2, 3 and 4 determined based on the direction vector (sx, sy) of the direction vector [WDirect(x, y)] of the shortest overexposed highlight pixel position corresponding to each pixel position (x, y).

The setting of the calculation expression at step S411 signifies that, where the overexposed highlight pixel at the shortest distance detected corresponding to a certain noticed pixel (x, y) exists in the horizontal direction with respect to the noticed pixel, the saturation reduction rate of the noticed pixel (x, y) is set to a comparatively high value. On the other hand, where the overexposed highlight pixel at the shortest distance exists in the vertical direction with respect to the noticed pixel, the saturation reduction rate of the noticed pixel (x, y) is set to a comparatively low value.

At step S412, the gain [gain] calculated at step S411 is set as the directional gain [Dr(x, y)] corresponding to the noticed pixel (x, y).

The directional gain calculation section 304 calculates the directional gain [Dr] based on the directional vector [WDirect] 356 outputted from the overexposed highlight distance-direction vector calculation section 302, that is, the direction vector [WDirect] 356 from the noticed pixel toward the nearest overexposed highlight pixel, and outputs the calculated directional gain [Dr] to the saturation reduction rate calculation section 307.

The directional gain calculation section 304 executes the individual-direction gain calculation in accordance with the following expression as described hereinabove:

$$\text{gain} = a \times (4-\text{angle})/4 + b \times \text{angle}/4$$

Here, the values of a and b are set to a=1.0 and b=0.7. In this setting, the "gain" calculated based on the value: 0 to 4 of the angle ("angle") of the direction vector [WDirect(x, y)] from the noticed pixel (x, y) toward the nearest overexposed highlight pixel, that is, the directional gain [Dr(x, y)], has the following value:

$$\text{angle}=0: Dr(x,y) = \text{gain} = 1.0$$

$$\text{angle}=1: Dr(x,y) = \text{gain} = 0.925$$

$$\text{angle}=2: Dr(x,y) = \text{gain} = 0.85$$

angle=3:$Dr(x,y)$=gain=0.755 angle=4:$Dr(x,y)$=gain=0.7

The directional gain [Dr(x, y)] is outputted to the saturation reduction rate calculation section 307 in the configuration shown in FIG. 4 and is applied as an index value to be used in calculation of a saturation reduction rate [R] of the noticed pixel (x, y). The saturation reduction rate [R] is set to a higher value as the directional gain [Dr(x, y)] is nearer to 1, but is set to a lower value as the directional gain [Dr(x, y)] is nearer to 0.

Accordingly, in the case of "angle"=0, the saturation reduction rate [R] is set to a high value, and the saturation of the noticed pixel (x, y) is reduced by a great amount. However, in the case of "angle"=4, the saturation reduction rate [R] is set to a low value and the reduction amount of the saturation for the noticed pixel (x, y) is set to a low value.

The reason why such a saturation reduction process as described above is executed is described with reference to FIG. 13. As described hereinabove, the image processing apparatus of the present invention executes processing of moving picture data, which are inputted, for example, at a fixed frame rate, on the real time basis. In particular, image frame data picked up is inputted to the digital signal processing section (DSP) 106 (refer to FIG. 1) of the apparatus, and a process of executing correction of pixel values is performed while pixel information is read along a scanning line.

In the image processing apparatus of the present invention, it is necessary to perform a correction process on the real time basis based on pixel information inputted along a scanning line. Where image data stored once in a memory are read out to execute a process therefor, it is possible to arbitrarily select pixel information at an arbitrary pixel position and perform a process applying pixel information corresponding to various selected pixels. However, where the image processing apparatus is configured so as to execute a correction process based on pixel information inputted along a scanning line, it is necessary to perform a process applying only pixel information temporarily accumulated in the memory in the DSP 106 (refer to FIG. 1).

The pixel information temporarily stored in the memory in the DSP 106 is only pixel information corresponding to a fixed number of pixels along the scanning line. Accordingly, where it is tried to correct pixel values of a noticed pixel (x, y) based on pixel value information of peripheral pixels, only pixel information corresponding to those pixels which are positioned in the proximity of the pixel position of the noticed pixel (x, y) and along the scanning line is applicable information.

Figure 13:
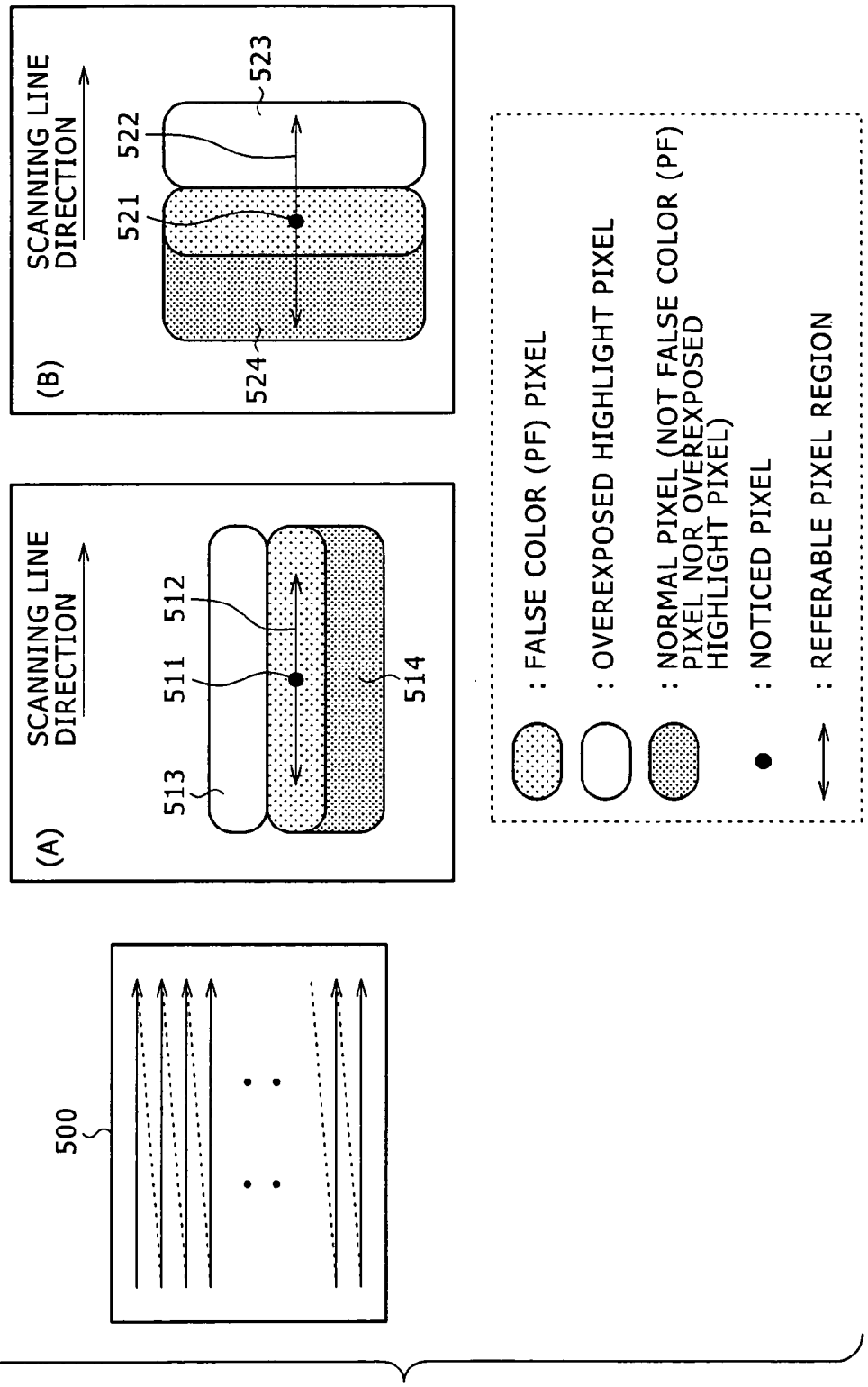
FIG. 13 is a schematic view illustrating a process of executing correction of a pixel value while pixel information is read along a scanning line.

Thus, as seen in FIG. 13, it is necessary for pixel data values to be read along a scanning line (arrow mark in an image frame) of an image frame 500 and processed by the DSP 106. (A) of FIG. 13 illustrates a process where false color (PF) pixels successively appear along the horizontal direction of a noticed pixel 511, that is, in a scanning line direction, and (B) of FIG. 13 illustrates a process where false color (PF) pixels successively appear in a vertical direction of a noticed pixel 521, that is, a direction perpendicular to a scanning line.

Where false color (PF) pixels successively appear along the horizontal direction of the noticed pixel 511, that is, in the direction of a scanning line as seen in (A) of FIG. 13, if it is tried to execute pixel value correction of the noticed pixel 511 based on pixel information of surrounding pixels, pixel information which can be temporarily stored in the memory in the DSP is only information of pixels along the scanning line, that is, only pixel information of pixels almost all of which are false color (PF) pixels. An arrow mark shown in (A) of FIG. 13 indicates a referable pixel region 512 as a region of pixel information which can be temporarily accumulated into the memory in the DSP.

In the configuration of (A) of FIG. 13, an overexposed highlight pixel 513 exists in a vertical (upward) direction of the noticed pixel 511, that is, in a direction perpendicular to a scanning line, and the angle ("angle") value mentioned hereinabove is "angle"=4, and where the setting of a=1.0 and b=0.7 given hereinabove is used, the gain of the angle value is calculated in accordance with the following expression:

gain=$a$×(4−angle)/4+$b$×angle/4 and therefore, the directional gain Dr(x, y) is given by $Dr(x,y)$=gain=0.7

In other words, the saturation reduction rate of the noticed pixel (x, y) is suppressed so that saturation reduction by a great amount is not executed. This is because, although the noticed pixel (x, y) is a false color (PF) pixel and requires saturation reduction, since also those pixels which can be referred to are false color (PF) pixels, a pixel having normal saturation information cannot be referred to, and if saturation reduction by a great amount is executed, then a saturation correction process wherein a normal pixel 514 which is a normal pixel positioned in the vertical direction, that is, in the case of the image configuration shown in (A) of FIG. 13, in the vertical (downward) direction, that is, which is neither false color (PF) pixel nor overexposed highlight pixel, is referred to is impossible and there is the possibility that the difference in saturation between the noticed pixel 511 for which the saturation reduction has been performed and the normal pixel 514 may become unsuitably great.

If the difference in saturation between the noticed pixel 511 for which the saturation reduction has been performed and the normal pixel 514 becomes great, then the unnaturalness of the image increases, resulting in deterioration of the quality of the image. In order to prevent such a situation as just described, in the case of such a configuration as shown in (A) of FIG. 13, even where the noticed pixel 511 is a false color (PF) pixel, excessive reduction of the saturation by reduction of the saturation reduction rate is not executed. It is to be noted that details of the saturation reduction process and the correction process are hereinafter described.

On the other hand, where false color (PF) pixels successively appear in a vertical direction of the noticed pixel 521, that is, in a direction perpendicular to the scanning line direction and particularly an overexposed highlight pixel 523 and a normal pixel 524 exist in the scanning line direction as seen in (B) of FIG. 13, if it is tried to execute pixel value correction of the noticed pixel 521 based on image information of surrounding pixels, then the pixel information which can be temporarily accumulated into the memory in the DSP is pixel information of those pixels which are positioned along the scanning line and included in a referable pixel region 522. In this instance, image information of the normal pixel 524 which is neither overexposed highlight pixel nor false color (PF) pixel can be applied.

In the configuration of (B) of FIG. 13, the overexposed highlight pixel 523 is positioned in the horizontal direction of the noticed pixel 521, that is, in the scanning direction, and the "angle" value described hereinabove is "angle"=0, and where the setting of a=1.0 and b=0.7 described hereinabove is used, the gain of the "angle" is calculated in accordance with the following expression:

gain=$a$×(4−angle)/4+$b$×angle/4 and the directional gain Dr(x, y) is given as $$Dr(x,y) = gain = 1.0$$

In other words, the saturation reduction rate of the noticed pixel (x, y) is set to a high value.

In the configuration of (B) of FIG. 13, the noticed pixel (x, y) 521 is a false color (PF) pixel, and even where a saturation reduction process by a great amount is executed, the pixel information of the normal pixel 524 positioned on the same scanning line as that of the noticed pixel (x, y) 521 can be read out from the memory in the DSP, and appropriate saturation correction with the saturation of the normal pixel 524 referred to can be performed. In other words, even if saturation reduction of the noticed pixel 521 by a great amount is executed, correction adapted for the saturation of the normal pixel 524 can be performed in later saturation correction.

This saturation correction process can prevent such a situation that the difference in saturation between the noticed pixel 521 and the normal pixel 524 becomes significantly great. Based on such a reason as just described, where the image has such a pixel configuration as shown in (B) of FIG. 13, the saturation reduction rate of the noticed pixel 521 is set to a high value.

Purple Degree Calculation Section 305

Now, details of the process of the purple degree calculation section 305 of the false color (PF) correction processing section 206 shown in FIG. 4 are described. The purple degree calculation section 305 receives the color difference component [C] 353 of the input image 351 as an input thereto as seen in FIG. 4 and executes a process of calculating the purple degree [Pr] 358 based on the color difference component [C] 353 and outputting the calculated purple degree [Pr] 358 to the false color degree calculation section 306. The process of the purple degree calculation section 305 is described below.

Color difference component [C] data of a noticed pixel (x, y) for which the process is to be executed by the purple degree calculation section 305 are represented by (Cr, Cb). In the present embodiment, the process is performed for data developed in the YCbCr color space, and as color information, color information of each pixel is defined on the CbCr color difference plane. The purple degree calculation section 305 receives color difference data (Cb, Cr) of the noticed pixel (x, y) as an input thereto and calculates and outputs the purple degree [Pr(x, y)] as closeness information to a hue of a false color (PF) for each noticed pixel to the false color degree calculation section 306.

The purple degree [Pr(x, y)] is represented by a value ranging from 0.0 to 1.0, and Pr=0.0 represents that the color is far from a false color (PF) hue whereas Pr=1.0 is closest to the false color (PF) hue.

Figure 14:
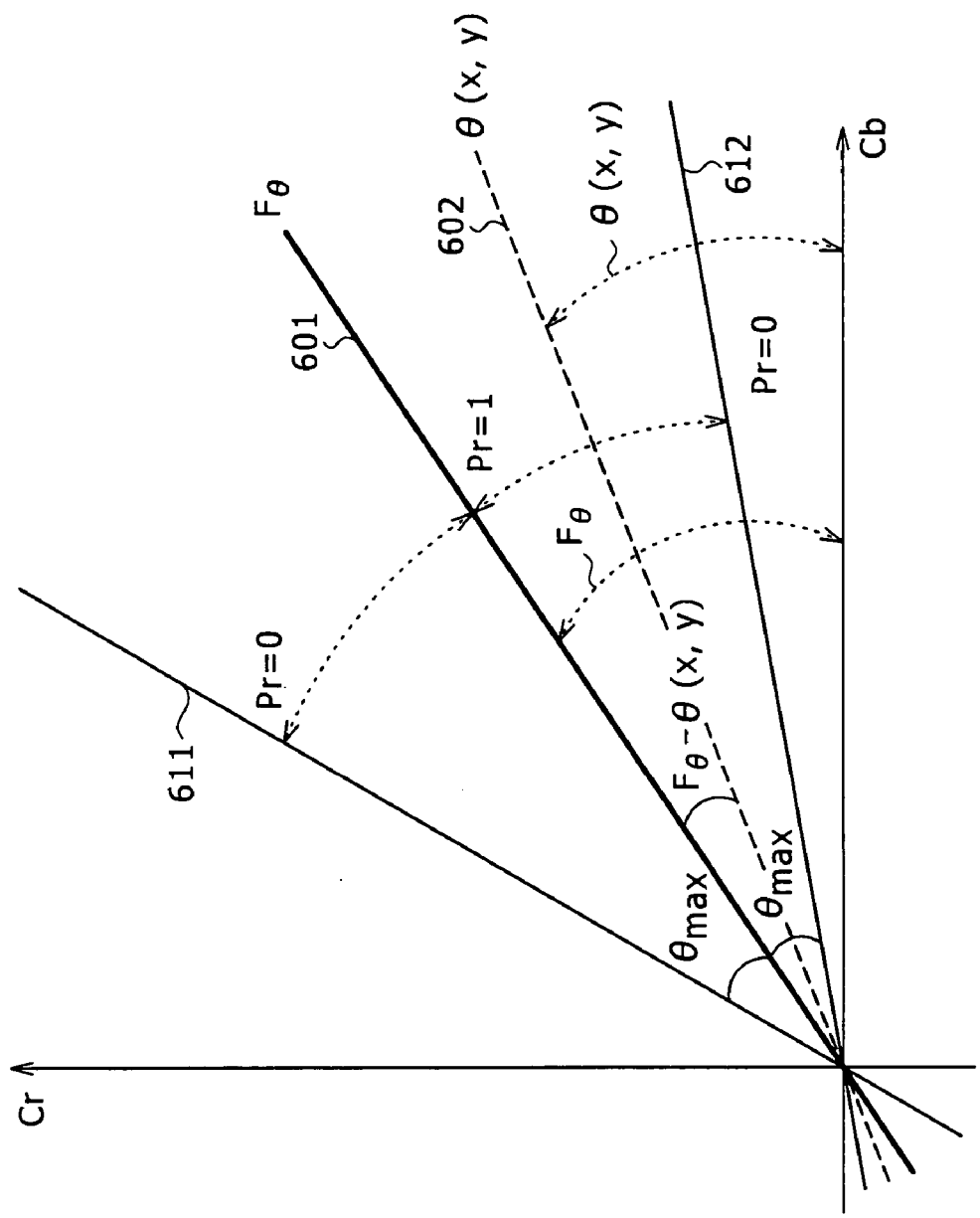
FIG. 14 is a diagram illustrating an example of setting of a false color (PF) hue and a purple degree on a CbCr color difference plane.

An example of setting of a false color (PF) hue and a purple degree [Pr] on the CbCr color difference plane is described with reference to FIG. 14. A graph shown in FIG. 14 indicates the CbCr color difference plane, and a line 601 ($F_\theta$) in FIG. 14 is false color (PF) hue line corresponding to a hue of a false color (PF) on the CbCr color difference plane. A typical purple fringe has a hue on the false color (PF) hue line 601.

Another line 602 in FIG. 14 is a noticed pixel hue line corresponding to the hue of the noticed pixel (x, y) shown as an example. As the noticed pixel hue line 602 comes nearer to the false color (PF) hue line 601, the hue of the noticed pixel (x, y) comes nearer to the false color (PF) hue, and as the noticed pixel hue line 602 goes away from the false color (PF) hue line 601, the hue of the noticed pixel (x, y) goes away from the false color (PF) hue.

Lines 611 and 612 in FIG. 14 are hue lines rotated by an angle $\theta_{max}$ from the false color (PF) hue line 601 and purple degree [Pr] 0 lines. The angle $\theta_{max}$ is set in advance and, for example, to 300. As the hue of the noticed pixel (x, y) comes nearer to the false color (PF) hue line 601 from the purple degree [Pr] 0 line 611 or 612, the value of the purple degree [Pr] becomes higher, and the purple degree [Pr] is 1 where the hue of the noticed pixel (x, y) is on the false color (PF) hue line 601. In particular, where the noticed pixel hue line 602 is between the purple degree [Pr] 0 lines 611 and 612, the purple degree [Pr] of the noticed pixel (x, y) is set to a value ranging from 0 to 1. Where the noticed pixel hue line 602 is not between the purple degree [Pr] 0 lines 611 and 612, the purple degree [Pr] of the noticed pixel (x, y) is set to 0.

The purple degree [Pr(x, y)] of the noticed pixel (x, y) is determined in accordance with the following expression:

$$Pr(x, y) = \frac{\theta_{max} - \{F_\theta - \theta(x, y)\}}{\theta_{max}} \quad (3)$$

where $F_\theta$ is the angle defined by the axis Cb and the false color (PF) hue line on the color difference data (Cb, Cr), $\theta(x, y)$ is the angle defined by the axis Cb and the noticed pixel hue line, and $\theta_{max}$ is the angle defined by and set in advance between the false color (PF) hue line and the purple degree [Pr] 0 line and is set, for example, to 30°.

In this manner, the purple degree calculation section 305 receives the color difference component [C] 353 of the input image 351 as an input thereto and executes a process of calculating the purple degree [Pr] 358 based on the color difference component [C] 353 in accordance with the calculation expression (3) given above and outputting the calculated purple degree [Pr] 358 to the false color degree calculation section 306.

False Color Degree Calculation Section 306

Now, details of the process of the false color degree calculation section 306 are described. The false color degree calculation section 306 calculates a false color degree [PFr] 359 based on the purple degree [Pr] 358 inputted from the purple degree calculation section 305 and the direction vector [WDirect] 356 inputted from the overexposed highlight degree calculation section 303 as seen in FIG. 4 and outputs the calculated false color degree [PFr] 359 to the saturation reduction rate calculation section 307.

The false color degree calculation section 306 calculates the false color degree [PFr(x, y)] of the noticed pixel (x, y) based on the purple degree [Pr(x, y)] of the noticed pixel (x, y) and the overexposed highlight degree [Wr(x, y)] of the noticed pixel (x, y) in accordance with the following expression (4):

$$PFr(x,y) = Pr(x,y) \times Wr(x,y) \quad (4)$$

The expression (4) indicates that the false color degree [PFr(x, y)] of the noticed pixel (x, y) is calculated by multiplication of the purple degree [Pr(x, y)] of the noticed pixel (x, y) and the overexposed highlight degree [Wr(x, y)] of the noticed pixel (x, y).

In the expression (4) above, the purple degree [Pr(x, y)] has a value ranging from 0 to 1, and also the overexposed highlight degree [Wr(x, y)] has a value ranging from 0 to 1. Therefore, the false color degree [PFr(x, y)] is set within a range from 0 to 1. The false color degree [PFr]=1.0 indicates that the false color degree is highest, that is, the possibility that the noticed pixel may have a false color (PF), is highest. On the other hand, the false color degree [PFr]=0.0 indicates that the false color degree is lowest, that is, the possibility that the noticed pixel may have a false color (PF), is lowest.

Saturation Reduction Rate Calculation Section 307

Now, details of the process of the saturation reduction rate calculation section 307 are described. The saturation reduction rate calculation section 307 calculates a saturation reduction rate [R] 361 based on the false color degree [PFr] 359 inputted from the false color degree calculation section 306 and the directional gain [Dr] 360 inputted from the directional gain calculation section 304 as seen in FIG. 4. Then, the saturation reduction rate calculation section 307 outputs the calculated saturation reduction rate [R] 361 to the processing sections of the correction processing section 310, that is, to the pixel saturation reduction processing section 311, pixel saturation correction processing section 312 and pixel color difference component blurring processing section 313.

The saturation reduction rate calculation section 307 calculates the saturation reduction rate R(x, y) of the noticed pixel (x, y) based on the false color degree [PFr(x, y)] of the noticed pixel (x, y) and the directional gain [Dr(x, y)] of the noticed pixel (x, y) in accordance with the following expression (5):

$$R(x,y) = PFr(x,y) \times Dr(x,y) \quad (5)$$

The expression (5) above indicates that the saturation reduction rate R(x, y) of the noticed pixel (x, y) is calculated by multiplication of the false color degree [PFr(x, y)] of the noticed pixel (x, y) and the directional gain [Dr(x, y)] of the noticed pixel (x, y).

In the expression (5) above, the false color degree [PFr(x, y)] has a value ranging from 0 to 1, and also the directional gain [Dr(x, y)] has a value ranging from 0 to 1. Therefore, also the saturation reduction rate R(x, y) is set within a range from 0 to 1. The saturation reduction rate R(x, y)=1.0 signifies that the saturation reduction process is executed with the highest level, and the saturation reduction rate R(x, y)=0.0 signifies that the saturation reduction process is executed with the lowest level.

The saturation reduction rate calculation section 307 calculates the saturation reduction rate [R] 361 based on the false color degree [PFr] 359 inputted from the false color degree calculation section 306 and the directional gain [Dr] 360 inputted from the directional gain calculation section 304 in accordance with the expression (5) given hereinabove. Then, the saturation reduction rate calculation section 307 outputs the calculated saturation reduction rate [R] 361 to the processing sections of the correction processing section 310, that is, to the pixel saturation reduction processing section 311, pixel saturation correction processing section 312 and pixel color difference component blurring processing section 313.

The processes described above are details of the process of the correction parameter (saturation reduction rate) calculation section 300 shown in FIG. 4, and by the process, a saturation reduction rate R(x, y) corresponding to a noticed pixel (x, y) is set and a pixel value correction process is executed applying the saturation reduction rate R(x, y) by the pixel saturation reduction processing section 311, pixel saturation correction processing section 312 and pixel color difference component blurring processing section 313 of the correction processing section 310.

In the following, details of the processes executed by the pixel saturation reduction processing section 311, pixel saturation correction processing section 312 and pixel color difference component blurring processing section 313 of the correction processing section 310 are described successively.

Pixel Saturation Reduction Processing Section 311

The pixel saturation reduction processing section 311 receives the color difference component [C] 353 of the input image 351 as an input thereto as seen in FIG. 4, and performs a saturation reduction process of a false color (PF) pixel portion based on the saturation reduction rate [R] 361 inputted from the correction parameter (saturation reduction rate) calculation section 300. Then, the pixel saturation reduction processing section 311 outputs a false color [PF] portion saturation reduction result image [Cs] 362 to the pixel saturation correction processing section 312.

A particular process of the pixel saturation reduction processing section 311 is described. The pixel saturation reduction processing section 311 calculates reduction saturations Cs(x, y)Cr and Cs(x, y)Cb of the Cr and Cb components of the noticed pixel (x, y) after the saturation reduction based on original saturations C(x, y)Cr and C(x, y)Cb of the Cr and Cb components of the noticed pixel (x, y) acquired based on the color difference component [C] 353 of the input image 351 and the saturation reduction rate R(x, y) of the noticed pixel (x, y) inputted from the correction parameter (saturation reduction rate) calculation section 300 in accordance with the following expressions (6):

$$Cs(x,y)Cr = C(x,y)Cr \times \{1.0 - R(x,y)\}$$

$$Cs(x,y)Cb = C(x,y)Cb \times \{1.0 - R(x,y)\} \quad (6)$$

where the saturation reduction rate R(x, y) of the noticed pixel (x, y) has a value within a range from 0 to 1 and has a value nearer to 1 as the false color degree [PFr(x, y)] of the noticed pixel (x, y) becomes higher. In the expressions 6 above, $$\{1.0 - R(x,y)\}$$

has a value which decreases toward 0 as the false color degree [PFr(x, y)] of the noticed pixel (x, y) becomes higher, and the expressions (6) above represent a process of multiplying the original saturation C(x, y) by the value of {1.0−R(x, y)}; as the false color degree [PFr(x, y)] of the noticed pixel (x, y) becomes higher, the degree by which the saturation is reduced increases.

In other words, the expressions (6) signify that a process of reducing the saturation by a greater amount as the false color degree [PFr(x, y)] of the noticed pixel (x, y) increases (approaches 1) but decreasing the degree of reduction as the false color degree [PFr(x, y)] of the noticed pixel (x, y) decreases (approaches 0).

Pixel Saturation Correction Processing Section 312

The pixel saturation correction processing section 312 receives the false color [PF] portion saturation reduction result image [Cs] 362 from the pixel saturation reduction processing section 311 as an input thereto as seen in FIG. 4 and executes correction of the reduction amount of the saturation. In particular, the pixel saturation correction processing section 312 detects a portion where the saturation has been reduced excessively or the like by the pixel saturation reduction processing section 311 and performs a saturation correction process with reference to the saturations of surrounding pixels. The pixel saturation correction processing section 312 selects a pixel for which the saturation reduction process has been executed by the pixel saturation reduction processing section 311, that is, a pixel which has been decided principally as a false color (PF) pixel, and performs a correction process for the selected pixel. In particular, since the object range of the saturation correction is a portion in which the saturation has been reduced, it becomes necessary to select a pixel whose saturation reduction rate [R] 361 is not 0, and therefore, the pixel saturation correction processing section 312 receives the saturation reduction rate [R] 361 as an input thereto, selects a pixel whose saturation reduction rate [R] 361 is not equal to 0 and performs saturation correction for the selected pixel. A saturation correction image [Cc] 363 which is an image for which the saturation correction is performed is outputted to the pixel color difference component blurring processing section 313. Details of the process of the pixel saturation correction processing section 312 are described now with reference to a processing flow illustrated in FIG. 15. It is to be noted that the processing flow illustrated in FIG. 15 corresponds to the detailed process of the saturation correction process at step S108 of the flow chart of FIG. 5.

It is to be noted that also the processing flow illustrated in FIG. 15 has two frameworks similar to those of the other flows described hereinabove, that is, an outer framework denoted by For (y=0; y<height; y=y+1) and an inner framework denoted by For (x=0; x<width; x=x+1), and processes at the steps are successively executed for the component pixels of (x=0 to "width", y=0 to "height") of the processing object image frame. However, the pixel saturation correction processing section 312 selects a pixel whose saturation reduction rate [R] has a value higher than 0 as a noticed pixel and performs a process in accordance with the flow illustrated in FIG. 15 for the selected pixel. In particular, at a stage preceding to step S501, it is decided whether or not a pixel inputted along a scanning line has a value of the saturation reduction rate [R] higher than 0. Then, only when it is decided that the pixel has a value of the saturation reduction rate [R] higher than 0, the pixel is selected as a noticed pixel (x, y) and the processing at steps beginning with step S501 is executed.

Figure 15:
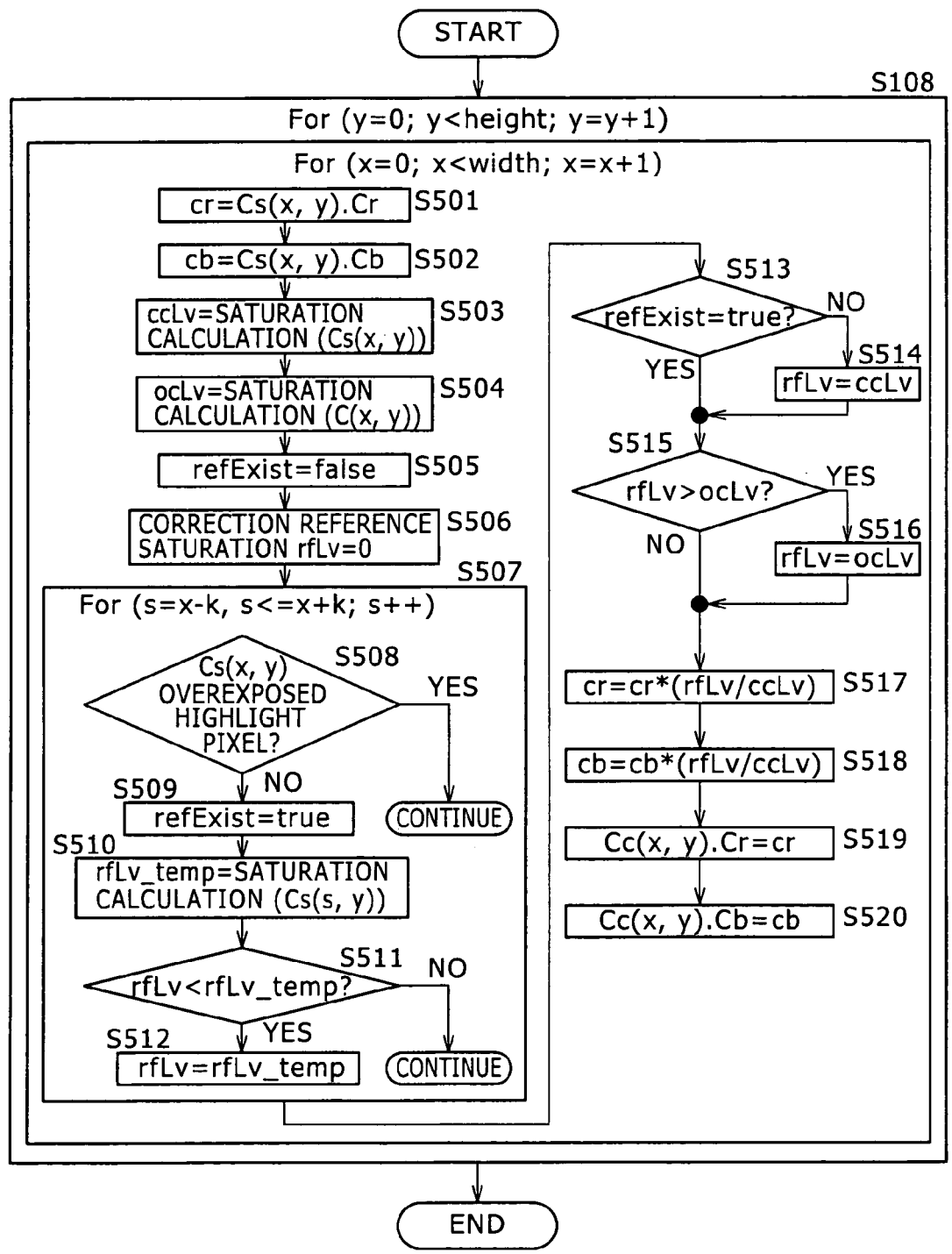
FIG. 15 is a flow chart illustrating details of a process by a pixel chromatic saturation correction processing section shown in FIG. 4.

Referring to FIG. 15, at steps S501 and S502, an initialization process of values cr and cb to $$cr = Cs(x,y)Cr$$

$$cb = Cs(x,y)Cb$$

as saturation parameters of the noticed pixel (x, y) are executed applying the color components Cs(x, y)Cr and Cs(x, y)Cb of the noticed pixel (x, y) after the saturation reduction, respectively.

Then at steps S503 and S504, the pixel saturation correction processing section 312 calculates a saturation [ccLv] based on the hue Cs(x, y) of the noticed pixel (x, y) for which the saturation reduction process has been performed by the pixel saturation reduction processing section 311 and a saturation [ocLv] based on the original saturation C(x, y) of the noticed pixel (x, y) before the saturation reduction process has been performed by the pixel saturation reduction processing section 311. The saturation calculation is executed in accordance with the following expressions (7):

$$ccLv = |Cs(x,y)Cr| + |Cs(x,y)Cb|$$

$$ocLv = |C(x,y)Cr| + |C(x,y)Cb| \quad (7)$$

Then at steps S505 and S506, the pixel saturation correction processing section 312 executes initialization of reference pixels in the proximity of the noticed pixel. In particular, at step S505, the pixel saturation correction processing section 312 sets a parameter [refExist] representative of information of whether or not a reference pixel exists in the proximity of the noticed pixel to [refExist]="false" to set the parameter [refExist] to absence of a reference pixel. Then at step S506, the pixel saturation correction processing section 312 initializes another parameter [rfLv] representative of a value of the reference saturation of a reference pixel to 0.

At next step S507, the pixel saturation correction processing section 312 executes a process of acquiring saturation information as pixel information of a reference pixel which can be acquired from within a neighboring region of the noticed pixel. It is to be noted that reference pixel information which can be acquired from a neighboring region of the noticed pixel is pixel information of pixels which are positioned in the proximity of the noticed pixel along the scanning line as described hereinabove with reference to FIG. 13. For example, a reference saturation is acquired from within a search range of k (for example, k=10) pixels on the left and right sides with respect to the noticed pixel.

Details of the process at step S507 are processes executed particularly at steps S508 to S512. It is to be noted that, at step S507, the search range is set to pixels on the left and right of the noticed pixel (x, y), and a reference pixel is represented as reference pixel (s, y), and the hue Cs of the reference pixel (s, y) after the saturation reduction is represented by Cs(s, y).

At step S508, the pixel saturation correction processing section 312 decides based on the hue Cs(s, y) of one selected reference pixel (s, y) after the saturation reduction whether or not the reference pixel (s, y) is an overexposed highlight pixel. If it is decided that the reference pixel (s, y) is an overexposed highlight pixel, then a succeeding process for a reference pixel is executed.

On the other hand, if it is decided that the reference pixel (s, y) is not an overexposed highlight pixel, then the processing advances to step S509, at which the pixel saturation correction processing section 312 sets a parameter [refExist] representative of information of presence/absence of a reference pixel to [refExist]="true" thereby to set the parameter [refExist] so as to represent presence of a reference pixel and then calculate a temporary saturation value [rfLv_temp] of the reference pixel based on the hue Cs(s, y) of the reference pixel (s, y). The hue calculation is performed in accordance with $$rfLv\_temp = |Cs(s,y)Cr| + |Cs(s,y)Cb|$$

similarly to the expression (7) given hereinabove.

Then, the pixel saturation correction processing section 312 decides whether or not the temporary saturation value [rfLv_temp] of the reference pixel has a value higher than the saturation value [rfLv] of a reference pixel calculated before then, that is, whether or not the expression:

$$rfLv < rfLv\_temp$$

is satisfied. If the expression is not satisfied, then the processing advances to a next process for the reference pixel. However, if the expression is satisfied, then the pixel saturation correction processing section 312 executes, at step S512, a process of updating the saturation value [rfLv] of the reference pixel as the temporary saturation value [rfLv_temp] of the reference pixel.

The processes described above are executed for the search range of k (for example, k=10) pixels on the left and right with respect to the noticed pixel and determines the saturation value of that one of reference pixels included in the search range other than overexposed highlight pixels which has the highest saturation as the saturation value [rfLv] of a reference pixel. It is to be noted that, if the k (for example, k=10) pixels on the left and right of the noticed pixel include only overexposed highlight pixels, then the parameter [refExist] representative of presence/absence of a reference pixel is set to [refExist]="false" so that the setting of absence of a reference pixel is maintained.

At step S513, the referable pixel region 512 decides whether or not the parameter [refExist] representative of presence/absence of a reference pixel is [refExist]="true", that is, whether or not the parameter [refExist] indicates presence of a reference pixel. If [refExist]="false", that is, if no reference pixel exists, then the processing advances to step S514, at which the pixel saturation correction processing section 312 sets the saturation value [rfLv] of the reference pixel to the saturation [ccLv] which is based on the hue Cs(x, y) of the noticed pixel (x, y) for which the saturation reduction process has been performed by the pixel saturation reduction processing section 311. Thereafter, the processing advances to step S515.

After the process at step S514 and when it is decided at step S513 that the parameter [refExist] representative of presence/absence of a reference pixel is [refExist]="true", that is, a reference pixel is present, the processing advances to step S515, at which the pixel saturation correction processing section 312 executes comparison between the saturation value [rfLv] of the reference pixel and the original saturation [ocLv] of the noticed pixel prior to the saturation reduction. If $$rfLV<ocLv$$

is satisfied, that is, if the value of the original saturation [ocLv] of the noticed pixel prior to the saturation reduction is higher than the saturation value [rfLv] of the reference pixel, then the processing advances to step S516. At step S516, the pixel saturation correction processing section 312 executes a process of setting the saturation value [rfLv] of the noticed pixel to the original saturation [ocLv] of the noticed pixel prior to the saturation reduction.

After the process at step S516 and when it is decided at step S515 that rfLV<ocLV is not satisfied, that is, the value of the original saturation [ocLv] of the noticed pixel prior to the saturation reduction is not higher than the saturation value [rfLv] of the reference pixel, the pixel saturation correction processing section 312 updates, at steps S517 and S518, color difference component values [cr] and [cb] of the noticed pixel (x, y) in accordance with the following expressions:

$$cr=cr \times (rfLv/ccLv)$$

$$cb=cb \times (rfLv/ccLv)$$

The expressions above are processes executed to adjust the color difference component values [cr] and [cb] of a result of the reduction in saturation by the pixel saturation reduction processing section 311 with regard to the noticed pixel (x, y) with the ratio between a saturation [xxLv] of the noticed pixel after the saturation reduction process and the saturation value [rfLv] of the reference pixel, that is, rfLv/ccLv.

If the saturation value [rfLv] of the reference pixel which has the highest saturation from among the pixels selected in the reference pixel acquisition region other than overexposed highlight pixels is lower than the original saturation [ocLv] of the noticed pixel prior to the saturation reduction (step S515: No), then the pixel saturation correction processing section 312 applies the saturation value [rfLv] of the reference pixel having the highest saturation to set a value of rfLv/ccLv.

However, if the saturation value [rfLv] of the reference pixel which has the highest saturation from among the pixels selected in the reference pixel acquisition region other than overexposed highlight pixels is higher than the original saturation [ocLv] of the noticed pixel prior to the saturation reduction (step S515: Yes), then the pixel saturation correction processing section 312 changes the saturation value [rfLv] of the reference pixel having the highest saturation to the original saturation [ocLv] of the noticed pixel before the saturation reduction to set the value of rfLv/ccLv.

Then, the pixel saturation correction processing section 312 calculates, based on the set values (rfLv/ccLv), $$cr=cr \times (rfLv/ccLv)$$

$$cb=cb \times (rfLv/ccLv)$$

and updates the color difference component values [cr] and [cb] of the noticed pixel (x, y) with the resulting values.

The reference for the reference saturation is conditioned such that the pixel has the highest saturation within the search range and is not an overexposed highlight pixel. If the saturation value [rfLv] is found within the search range (refExist="true"), then if it is not higher than the saturation [ocLv] of the original image, then the pixel saturation correction processing section 312 executes a process of multiplying the color components after the saturation reduction by rfLv/ccLv, that is, a process of raising the saturation, which has been reduced to ccLv by the saturation reduction, to the saturation value [rfLv]. However, if the saturation value [rfLv] is higher than the saturation [ocLv] of the original image, then the pixel saturation correction processing section 312 sets the saturation value [rfLv] to rfLv=ocLv at step S516 to raise the saturation correction to ocLv/ccLv times such that, even if correction is performed by the maximum amount, the saturation is not raised beyond that of the original image. If the saturation value [rfLv] is not available, then no particular correction of the saturation is performed.

The reason why that one of the reference pixels having the highest saturation is applied in the saturation correction is that, where the saturation of the noticed pixel (x, y) is higher than those of surrounding pixels, the saturation of the noticed pixel (x, y) is adjusted so as to become nearer to those of the surrounding pixels thereby to prevent the differences in saturation between the pixels from becoming excessively great to prevent the false color (PF) pixels, for which the saturation reduction process has been performed, from becoming conspicuous.

At steps S519 and S520, the pixel saturation correction processing section 312 applies the following values cb and cr:

$$cr=cr \times (rfLv/ccLv)$$

$$cb=cb \times (rfLv/ccLv)$$

which are the hue data of the noticed pixel calculated at steps S517 and S518 to set the color components [Cc] of the noticed pixel (x, y) after the saturation correction respectively as $$Cc(x,y)Cr=cr$$

$$Cc(x,y)Cb=cb$$

As described above, the pixel saturation correction processing section 312 corrects the color components [Cc] of the noticed pixel (x, y) after the saturation correction in the following processing manner. In particular, the pixel saturation correction processing section 312 executes processes of (a) selecting those pixels which are positioned in the proximity of a saturation reduction pixel which is a noticed pixel (x, y) and besides positioned on the same scanning line as that of the saturation reduction pixel as reference pixels and adjusting the saturation of the saturation reduction pixel so as to become nearer to the saturation value [rfLv] of that one of the reference pixels which has the highest saturation, and (b) adjusting, if the saturation of that one of the reference pixels along the same scanning line as that of the saturation reduction pixel which has the highest saturation is lower than that of the saturation reduction pixel before the saturation reduction, the saturation of the saturation reduction pixel which is the noticed pixel (x, y) so as to become nearer to the saturation [ocLv] prior to the saturation reduction.

The pixel saturation correction processing section 312 receives the false color [PF] portion saturation reduction result image [Cs] 362 as an input thereto from the pixel saturation reduction processing section 311, executes correction of the reduction amount of the saturation to produce a saturation correction image [Cc] 363 and outputs the saturation correction image [Cc] 363 to the pixel color difference component blurring processing section 313 in this manner.

Pixel Color Difference Component Blurring Processing Section 313

Now, a process of the pixel color difference component blurring processing section 313 is described. The pixel color difference component blurring processing section 313 executes a process of applying blurring to the color difference component of the saturation correction image [Cc] 363, that is, a blurring process. The pixel color difference component blurring processing section 313 executes a process of reducing the difference in hue between a pixel for which the saturation reduction process is executed and a surrounding pixel.

It is to be noted that also the blurring process to be executed by the pixel color difference component blurring processing section 313 is not performed for all pixels but is executed for pixels in a pixel region selected as a processing object which includes pixels for which the saturation reduction and correction processes have been performed. The pixel color difference component blurring processing section 313 receives the saturation reduction rate [R] 361 as an input thereto for the selection of a processing object region, selects those pixels whose saturation reduction rate [R] 361 is not equal to 0, determines a processing object region for the blurring process and performs a blurring process for the determined processing object region. Details of the process of the pixel color difference component blurring processing section 313 are described with reference to a processing flow illustrated in FIG. 16. It is to be noted that the processing flow illustrated in FIG. 16 corresponds to detailed processing of the false color (PF) pixel color different component blurring process at step S109 of the flow chart of FIG. 5.

The processing of the pixel color difference component blurring processing section 313 is to smooth the saturation variation at a portion for which saturation correction is performed and apply blurring in order to conform a boundary portion between a portion in which the saturation is reduced and a normal pixel portion in which the saturation is not reduced. Also the blurring process is executed using only pixel information of those pixels which exist on the left and right of a noticed pixel along the scanning line.

It is to be noted that also the processing flow illustrated in FIG. 16 has two frameworks similar to those of the other flows described hereinabove, that is, an outer framework denoted by For (y=0; y<height; y=y+1) and an inner framework denoted by For (x=0; x<width; x=x+1), and processes at the steps are successively executed for the component pixels of (x=0 to "width", y=0 to "height") of the processing object image frame. However, the pixel color difference component blurring processing section 313 selects those pixels whose saturation reduction rate [R] is not equal to 0, determines a processing object region for a blurring process and performs a blurring process for the processing object region. Accordingly, at a stage preceding to step S601, it is decided whether or not a pixel inputted along a scanning line has a value of the saturation reduction rate [R] which is not equal to 0. Then, only when it is decided that the pixel has a value of the saturation reduction rate [R] which is not equal to 0, the pixel is selected as a noticed pixel (x, y) and the processing at steps beginning with step S601 is executed.

Figure 16:
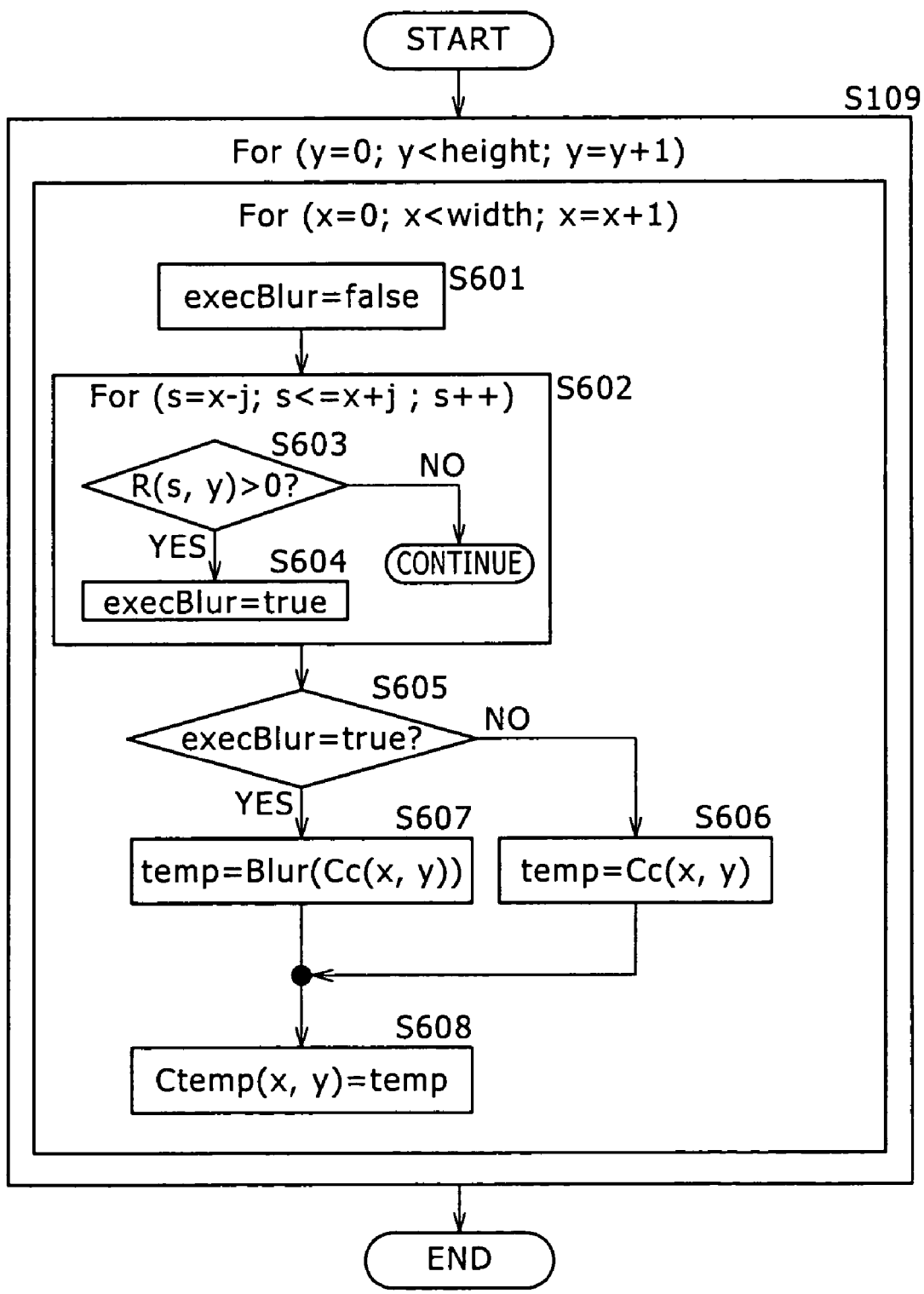
FIG. 16 is a flow chart illustrating details of a pixel color difference component blurring processing section shown in FIG. 4.

Processes at the individual steps of the flow chart illustrated in FIG. 16 are described. The pixel color difference component blurring processing section 313 executes initialization at step S601. In particular, the pixel color difference component blurring processing section 313 initializes a flag [execBlur] representative of whether or not a blurring process should be executed for the noticed pixel (x, y) to [execBlur]="false" thereby to initialize the flag [execBlur] so as not to apply blurring.

Then at step S602, the pixel color difference component blurring processing section 313 acquires the saturation reduction rates R(s, y) of peripheral pixels (s, y) as acquirable pixel information of reference pixels around the noticed pixel (x, y). If a pixel having a saturation reduction rate R(s, y) which is higher than 0 is detected from among the peripheral pixels (s, y) (step S603: Yes), then the pixel color difference component blurring processing section 313 updates, at step S604, the flag [execBlur], which is a flag indicative of whether or not a blurring process should be performed, to [execBlur]="true" thereby to set the flag [execBlur] so as to execute blurring. It is to be noted that reference pixel information acquirable from a neighboring region of a noticed pixel is pixel information of pixels which neighbor with the noticed pixel along the scanning line as described hereinabove with reference to FIG. 13. Thus, the pixel color difference component blurring processing section 313 acquires pixel information [saturation reduction rates R(s, y)] from a search region which includes, for example, j (for example, j=7) pixels on the left and right of the noticed pixel and then executes the process at step S602 (steps S603 to S604).

Then, if it is decided at step S605 that the flag [execBlur] is set to [true], then the processing advances to step S607, at which the pixel color difference component blurring processing section 313 executes a process of applying blurring (Blur) filter centered at the noticed pixel (x, y). The color component [Blur(Cc(x, y))] of the noticed pixel (x, y) after the blurring process by the blurring filter is calculated in accordance with the following expression (8):

$$Blur(Cc(x, y)) = \left( \sum_{i=1}^{7} Cc(x+i, y) + \sum_{i=1}^{7} Cc(x-i, y) + 2 \times Cc(x, y) \right) / 16 \quad (8)$$

The pixel color difference component blurring processing section 313 performs calculations for the color difference component values [cr] and [cb] of the noticed pixel (x, y) in accordance with the expression (8) above to calculate the color components [Blur(Cc(x, y))] of the color difference component values [cr] and [cb] after the saturation correction. It is to be noted that, in the expression (8) above, Cc(x, y) is a color component [Cc(x, y) of the noticed pixel (x, y) after the saturation correction, and Cc(x+i, y) and Cc(x−i, y) are color components [Cc] after the saturation correction of the pixels moved by ±i pixel distances from the noticed pixel (x, y) on the scanning line.

The expression above represents an example wherein the blurring process in which color components of ±7 pixels from the noticed pixel are applied is executed. It is to be noted that the manner of the blurring process is not limited to that to which the expression (8) given above is applied. The blurring process may have any form so long as it is a process effective to conform a boundary portion between a portion in which the saturation is reduced and a normal pixel portion in which the saturation is not reduced.

The pixel color difference component blurring processing section 313 executes the process described above to produce and output a correction color difference component image [Ctemp] 364 as a result of the correction as seen in FIG. 4. The correction color difference component image [Ctemp] 364 is synthesized with the luminance component [Y] 365 and outputted as a final YCbCr output image 371. The YCbCr output image 371 as the result of the correction process is stored into the memory in the image processing apparatus and/or outputted to the outputting section such as the monitor apparatus.

It is to be noted that, although it is described above that the YCbCr color space is applied in the process of the embodiment, the process according to the present invention described above can be applied to any other color space such as the CIEL*a*b* space so long as information thereof includes luminance information and hue information separate from each other.

By the process of the present invention described above, while pixel information is successively fetched along a scanning line, pixel value correction in which only pixel information of those pixels which are positioned in the proximity of a noticed pixel (x, y) along the scanning line is used can be performed. Consequently, it becomes possible to process image data picked up by a video camera on a real-time basis and to execute pixel value correction of a false color (PF) pixel without making the difference in saturation from surrounding pixels excessively great. Consequently, it is possible to produce image data of a high quality.

It is to be noted that the series of processes described hereinabove can be executed by hardware or by software or by a composite configuration of hardware and software. Where the series of processes is executed by software, a program which records a processing sequence of the software can be installed into a memory in and executed by a computer incorporated in hardware for exclusive use or can be installed into and executed by a computer for universal use.

For example, the program can be recorded in advance on a hard disk or in a ROM (Read Only Memory) as a recording medium. Or the program may be stored (recorded) temporarily or permanently on a removable recording medium such as a flexible disk, a CD-ROM (Compact Disc-Read Only Memory), an MO (Magneto-Optical) disk, a DVD (Digital Versatile Disk), a magnetic disk or a semiconductor memory. Such a removable recording medium as just described can be provided as package software.

It is to be noted that, while the program can be installed from such a removable-recording medium as described above into a computer, it may otherwise be transferred by radio from a download site to the computer or transferred by wire communication through a network such as a LAN (Local Area Network) or the Internet to the computer. The computer can receive the program transferred in this manner and install the program into a recording medium such as a hard disk built therein.

It is to be noted that the processes described in the present specification may be processed in a time series in the order as described or may be processed parallelly or individually depending upon the processing capacity of the apparatus which executes the process or as occasion demands. Further, in the present specification, the term "system" is used to represent an entire apparatus composed of a plurality of apparatus, but the components may not necessarily be housed in the same housing.

While a preferred embodiment of the present invention has been described using specific terms, such description is for illustrative purpose only, and it is to be understood that changes and variations may be made without departing from the spirit or scope of the following claims.

What is claimed is:

1. An image processing apparatus, comprising:
a correction parameter calculation section for calculating, as a correction parameter for component pixels of a processing image, a saturation reduction rate corresponding to each of the pixels; and
a correction processing section for applying the saturation reduction rate to execute a pixel value correction process including a saturation reduction process of the component pixels of the processing image;
said correction processing section including a pixel saturation reduction processing section for executing the saturation reduction process for each of the pixels based on the saturation reduction rate calculated by said correction parameter calculation section, and a pixel saturation correction processing section for correcting the saturation of any saturation reduction pixel whose saturation has been reduced by said pixel saturation reduction processing section so that the difference of the saturation of the saturation reduction pixel and the saturation of a surrounding reference pixel is reduced.

2. The image processing apparatus according to claim 1, wherein said correction processing section further includes a blurring processing section for executing, for output data of said pixel saturation correction processing section, a blurring process of reducing the difference in hue between any pixel for which the saturation reduction process has been performed and a surrounding pixel.

3. The image processing apparatus according to claim 1, wherein said pixel saturation correction processing section selects one of those pixels which are positioned in the proximity of the saturation reduction pixel and along the same scanning line as that of the saturation reduction pixel as a reference pixel and executes the saturation correction process for the saturation reduction pixel so that the difference between the saturation of the selected reference pixel and the saturation of the saturation reduction pixel is reduced.

4. The image processing apparatus according to claim 1, wherein said pixel saturation correction processing section selects those pixels which are positioned in the proximity of the saturation reduction pixel and along the same scanning line as that of the saturation reduction pixel as reference pixels and executes a process of adjusting the saturation of the saturation reduction pixel so as to approach the saturation of that one of the reference pixels which has the highest saturation.

5. The image processing apparatus according to claim 1, wherein said pixel saturation correction processing section selects those pixels which are positioned in the proximity of the saturation reduction pixel and along the same scanning line as that of the saturation reduction pixel as reference pixels and executes, if the saturation of that one of the reference pixels which has the highest saturation is equal to or lower than the saturation of the saturation reduction pixel prior to the saturation reduction, a process of adjusting the saturation of the saturation reduction pixel so as to approach the saturation of the saturation reduction pixel prior to the saturation reduction.

6. The image processing apparatus according to claim 1, wherein said correction parameter calculation section calculates, as regards a noticed pixel selected from within the processing image, (a) a purple degree as similarity information between the hue of the noticed pixel and the hue of a false color, and
(b) distance information of the noticed pixel from an overexposed highlight pixel, calculates
(c) a false color degree based on the purple degree and the distance information, and
(d) a directional gain based on direction information of the noticed pixel from the overexposed highlight pixel, and
calculates the saturation reduction rate corresponding to the noticed pixel based on the false color degree and the directional gain.

7. The image processing apparatus according to claim 6, wherein said correction parameter calculation section calculates the false color degree which has a value which increases as the similarity between the hue of the noticed pixel and the hue of the false color increases and as the distance from the overexposed highlight pixel increases,
calculates the directional gain which has a value which increases as the parallelism between the noticed pixel and overexposed highlight pixel and the scanning line increases, and
calculates the saturation reduction rate which has a value which increases as the false color degree of the noticed pixel increases and as the directional gain increases, and
said pixel saturation reduction processing section executes the saturation reduction process for each pixel based on the saturation reduction rate calculated by said correction parameter calculation section.

8. The image processing apparatus according to claim 6, wherein the false color is a purple fringe, and the purple degree serves as the similarity information between the hue of the noticed pixel and the hue of the purple fringe.

9. A computer implemented image processing method, comprising the steps of:
calculating, as a correction parameter for component pixels of a processing image, a saturation reduction rate corresponding to each of the pixels; and
a correction processing step for applying the saturation reduction rate to execute a pixel value correction process including a saturation reduction process of the component pixels of the processing image;
the correction processing step including steps of a pixel saturation reduction processing step for executing the saturation reduction process for each of the pixels based on the saturation reduction rate calculated by the correction parameter calculation step, and a pixel saturation correction processing step for correcting the saturation of any saturation reduction pixel whose saturation has been reduced by the pixel saturation reduction processing step so that the difference of the saturation of the saturation reduction pixel and the saturation of a surrounding reference pixel is reduced.

10. The image processing method according to claim 9, wherein the correction processing step further includes a blurring processing step of executing, for output data of the pixel saturation correction processing step, a blurring process of reducing the difference in hue between any pixel for which the saturation reduction process has been performed and a surrounding pixel.

11. The image processing method according to claim 9, wherein the pixel saturation correction processing step selects one of those pixels which are positioned in the proximity of the saturation reduction pixel and along the same scanning line as that of the saturation reduction pixel as a reference pixel and executes the saturation correction process for the saturation reduction pixel so that the difference between the saturation of the selected reference pixel and the saturation of the saturation reduction pixel is reduced.

12. The image processing method according to claim 9, wherein the pixel saturation correction processing step selects those pixels which are positioned in the proximity of the saturation reduction pixel and along the same scanning line as that of the saturation reduction pixel as reference pixels and executes a process of adjusting the saturation of the saturation reduction pixel so as to approach the saturation of that one of the reference pixels which has the highest saturation.

13. The image processing method according to claim 9, wherein the pixel saturation correction processing step selects those pixels which are positioned in the proximity of the saturation reduction pixel and along the same scanning line as that of the saturation reduction pixel as reference pixels and executes, if the saturation of that one of the reference pixels which has the highest saturation is equal to or lower than the saturation of the saturation reduction pixel prior to the saturation reduction, a process of adjusting the saturation of the saturation reduction pixel so as to approach the saturation of the saturation reduction pixel prior to the saturation reduction.

14. The image processing method according to claim 9, wherein the correction parameter calculation step calculates, as regards a noticed pixel selected from within the processing image,
(a) a purple degree as similarity information between the hue of the noticed pixel and the hue of a false color, and
(b) distance information of the noticed pixel from an overexposed highlight pixel,
calculates
(c) a false color degree based on the purple degree and the distance information, and
(d) a directional gain based on direction information of the noticed pixel from the overexposed highlight pixel, and
calculates the saturation reduction rate corresponding to the noticed pixel based on the false color degree and the directional gain.

15. The image processing method according to claim 14, wherein the correction parameter calculation step
calculates the false color degree which has a value which increases as the similarity between the hue of the noticed pixel and the hue of the false color increases and as the distance from the overexposed highlight pixel increases,
calculates the directional gain which has a value which increases as the parallelism between the noticed pixel and overexposed highlight pixel and the scanning line increases, and
calculates the saturation reduction rate which has a value which increases as the false color degree of the noticed pixel increases and as the directional gain increases, and
said pixel saturation reduction processing step executes the saturation reduction process for each pixel based on the saturation reduction rate calculated by the correction parameter calculation step.

16. The image processing method according to claim 14, wherein the false color is a purple fringe, and the purple degree serves as the similarity information between the hue of the noticed pixel and the hue of the purple fringe.

17. A computer program product for causing image processing to be executed on a computer, the computer program product being stored on a computer readable medium and configured to provide operations comprising:
calculating, as a correction parameter for component pixels of a processing image, a saturation reduction rate corresponding to each of the pixels; and a correction process for applying the saturation reduction rate to execute a pixel value correction process including a saturation reduction process of the component pixels of the processing image;

the correction process including a pixel saturation reduction process for executing the saturation reduction process for each of the pixels based on the saturation reduction rate calculated by the correction parameter calculation, and a pixel saturation correction process for correcting the saturation of any saturation reduction pixel whose saturation has been reduced by the pixel saturation reduction process so that the difference of the saturation of the saturation reduction pixel and the saturation of a surrounding reference pixel is reduced.

18. The computer program product according to claim 17, wherein the correction process further includes a blurring process for executing, for output data of the pixel saturation correction process, a reducing of the difference in hue between any pixel for which the saturation reduction process has been performed and a surrounding pixel.

19. The computer program product according to claim 17, wherein the pixel saturation correction process selects one of those pixels which are positioned in the proximity of the saturation reduction pixel and along the same scanning line as that of the saturation reduction pixel as a reference pixel and executes the saturation correction process for the saturation reduction pixel so that the difference between the saturation of the selected reference pixel and the saturation of the saturation reduction pixel is reduced.

20. The computer program product according to claim 17, wherein the pixel saturation correction process selects those pixels which are positioned in the proximity of the saturation reduction pixel and along the same scanning line as that of the saturation reduction pixel as reference pixels and executes a process of adjusting the saturation of the saturation reduction pixel so as to approach the saturation of that one of the reference pixels which has the highest saturation.

21. The computer program product according to claim 17, wherein the pixel saturation correction process selects those pixels which are positioned in the proximity of the saturation reduction pixel and along the same scanning line as that of the saturation reduction pixel as reference pixels and executes, if the saturation of that one of the reference pixels which has the highest saturation is equal to or lower than the saturation of the saturation reduction pixel prior to the saturation reduction, a process of adjusting the saturation of the saturation reduction pixel so as to approach the saturation of the saturation reduction pixel prior to the saturation reduction.

22. The computer program product according to claim 17, wherein the correction parameter calculation calculates, as regards a noticed pixel selected from within the processing image,
  (a) a purple degree as similarity information between the hue of the noticed pixel and the hue of a false color, and
  (b) distance information of the noticed pixel from an overexposed highlight pixel,
calculates
  (c) a false color degree based on the purple degree and the distance information, and
  (d) a directional gain based on direction information of the noticed pixel from the overexposed highlight pixel, and
calculates the saturation reduction rate corresponding to the noticed pixel based on the false color degree and the directional gain.

23. The computer program product according to claim 22, wherein the correction parameter calculation:
  calculates the false color degree which has a value which increases as the similarity between the hue of the noticed pixel and the hue of the false color increases and as the distance from the overexposed highlight pixel increases,
  calculates the directional gain which has a value which increases as the parallelism between the noticed pixel and overexposed highlight pixel and the scanning line increases, and
  calculates the saturation reduction rate which has a value which increases as the false color degree of the noticed pixel increases and as the directional gain increases, and
  said pixel saturation reduction process executes the saturation reduction process for each pixel based on the saturation reduction rate calculated by the correction parameter calculation.

24. The computer program product according to claim 22, wherein the false color is a purple fringe, and the purple degree serves as the similarity information between the hue of the noticed pixel and the hue of the purple fringe.

* * * * *